(12) United States Patent
Tsang et al.

(10) Patent No.: US 10,769,934 B2
(45) Date of Patent: Sep. 8, 2020

(54) CONTAINER SECURITY SYSTEM

(71) Applicant: In-Tech Enterprise, Ltd., Kwun Tong, Kowloon (HK)

(72) Inventors: Jacky Sai Ping Tsang, Shatin (HK); Cheuk Kuen Chim, Shatin (HK); Gordon Christopher Pope, The Peak (HK); Wing Hung Cheung, Kowloon (HK)

(73) Assignee: IN-TECH ENTERPRISE LTD., Kwun Tong, Kowloon (HK)

( * ) Notice: Subject to any disclaimer, the term of this patent is extended or adjusted under 35 U.S.C. 154(b) by 0 days.

(21) Appl. No.: 16/451,879

(22) Filed: Jun. 25, 2019

(65) Prior Publication Data

US 2019/0318610 A1 Oct. 17, 2019

Related U.S. Application Data

(63) Continuation of application No. 15/938,552, filed on Mar. 28, 2018, now Pat. No. 10,538,371.

(51) Int. Cl.
*G08B 25/10* (2006.01)
*H04W 84/18* (2009.01)
*B65D 55/02* (2006.01)

(52) U.S. Cl.
CPC ............ *G08B 25/10* (2013.01); *B65D 55/02* (2013.01); *H04W 84/18* (2013.01)

(58) Field of Classification Search
CPC ........ B65D 55/02; G08B 25/10; H04W 84/18
(Continued)

(56) References Cited

U.S. PATENT DOCUMENTS 7,302,609 B2 * 11/2007 Matena ................. G06F 9/5072
714/15
8,040,244 B2  10/2011 Bauchot
(Continued)

FOREIGN PATENT DOCUMENTS

CN    104685549 A   6/2015
EP      2083412 A1   7/2009
(Continued)

OTHER PUBLICATIONS

European Search Report, Application No. 19165829.3, dated Aug. 9, 2019.
(Continued)

*Primary Examiner* — John A Tweel, Jr.
(74) *Attorney, Agent, or Firm* — Haynes and Boone, LLP

(57) ABSTRACT

A container network includes a first container system that includes a first container first type communication interface, and a second container system that includes a second container first type communication interface. The second container system communicatively couples to the first container first type communication interface via the second container first type communication interface to form a first container-to-container connection. The second container system performs an exchange of election information of the first container system and second container system with the first container system via the first container-to-container connection, and elects, based on the election information, a second container second type communication interface included on the second container system to provide container network communications to a wide area network. The second container system then provides the container network communications via the second container second type communication interface to the wide area network.

20 Claims, 13 Drawing Sheets

(58) Field of Classification Search
USPC .......................................................... 340/541
See application file for complete search history.

(56) References Cited

U.S. PATENT DOCUMENTS

| | | | |
|---|---|---|---|
| 8,280,345 B2* | 10/2012 | Twitchell, Jr. ......... | G06Q 10/08 |
| | | | 455/404.2 |
| 8,456,302 B2 | 6/2013 | Stevens | |
| 9,798,294 B2 | 10/2017 | Markel et al. | |
| 10,358,259 B2* | 7/2019 | Andersen ............... | G08B 21/18 |
| 10,538,371 B2* | 1/2020 | Tsang .................... | G08B 13/02 |
| 2006/0095778 A1 | 5/2006 | He | |
| 2014/0091931 A1 | 4/2014 | Cova | |

FOREIGN PATENT DOCUMENTS

| | | |
|---|---|---|
| EP | 3284692 A1 | 2/2018 |
| WO | WO 2008/088341 | 7/2008 |

OTHER PUBLICATIONS

Notice of First Office Action, Chinese Application No. 201910241415.0, dated May 7, 2020, 11 pages.

\* cited by examiner

CONTAINER SECURITY SYSTEM

CROSS REFERENCE TO RELATED APPLICATION

The present application is a continuation-in-part of U.S. patent application Ser. No. 15/938,552, filed on Mar. 28, 2018, entitled "Container Security System," the disclosure of which are incorporated herein by reference.

FIELD OF THE DISCLOSURE

This disclosure relates generally to containers, and, more particularly, to closure security systems for containers.

BACKGROUND

Containers may be used for storage, shipping, and packaging of a variety of products. For example, intermediate bulk containers (IBCs), drums, barrels, bottles, and/or other containers are designed for the transport and storage of bulk liquid and granulated substances such as chemicals, food ingredients, solvents, pharmaceuticals, hazardous materials, and/or a variety of other goods and products known in the art. Containers typically have one or more openings that allow access to the containers through which the container may be filled with the product, and/or through which the product may be dispensed from the container. During shipment and storage, these openings may be obstructed with a variety of closures such as, for example, caps, plugs, tops, valves, lids, and other closures. These closures provide many benefits for the container and the product being shipped and/or stored within the container such as, for example, preventing the product within the container from escaping, preventing materials from outside of the container from entering the container and contaminating the product, preventing spoilage, as well as other uses that would be apparent to one of skill in the art.

Conventional closures attempt to provide container security by including seals that, when broken, indicate whether the container has been opened, prior to, or subsequent to filling the container with the product. Due to the nature of some products being shipped in containers, seals may be important for tracking and determining whether the product within the container has been tampered with (e.g., lost, stolen, and/or contaminated). For example, high value liquids used in agrochemical industries may be stolen and/or replaced with counterfeit products, and products used in food industry may require integrity and/or traceability. Such conventional container security systems provide the ability to detect whether the container has been tampered with by visual inspection of the seal. However, these conventional container security systems are subject to circumvention. For example, the seal may be broken, the closure removed, the product in the container replaced, diluted, or stolen (e.g., during shipment), and the closure and the seal then duplicated and replaced on the container such that the tampering with the product goes undetected.

Accordingly, it would be desirable to provide an improved closure security system for containers.

SUMMARY

According to one embodiment, a closure system includes: a closure chassis that is configured, when coupled to a container chassis, to prevent movement of a material between a container volume defined by the container chassis and an exterior of the container chassis via a first aperture defined by the container chassis; a first sensor subsystem that is coupled to the closure chassis and that is configured to generate a first sensor signal when the closure chassis experiences a tamper event; a first type communication interface housed in the closure chassis; a first processing system that is housed in the closure chassis and that is coupled to the first type communication interface and the first sensor subsystem; and a first memory system that is housed in the closure chassis and that includes instruction that, when executed by the first processing system, causes the first processing system to provide a first security engine that is configured to: receive a first sensor signal indicating that the closure chassis has experienced the tamper event; and provide, in response to receiving the first sensor signal using the first type communication interface, a first notification to a corresponding first type communication interface that the closure chassis has experienced the tamper event.

According to another embodiment, A container module, includes: a first type communication interface; a first component; a processing system that is coupled to the first type communication interface and the first component; and a memory system that is coupled to the processing system and that includes instruction that, when executed by the processing system, causes the processing system to provide a container engine that is configured to: communicatively couple to a first type communication interface include on a first container system via the first type communication interface to form a first container-to-container connection; perform a first exchange of first election information of the container module and second election information of the first container system with the first container system via the first container-to-container connection; elect, based on the first election information and the second election information, the first component over a first container component included on the first container system that corresponds with the first component; and operate the first component.

Figure 1:
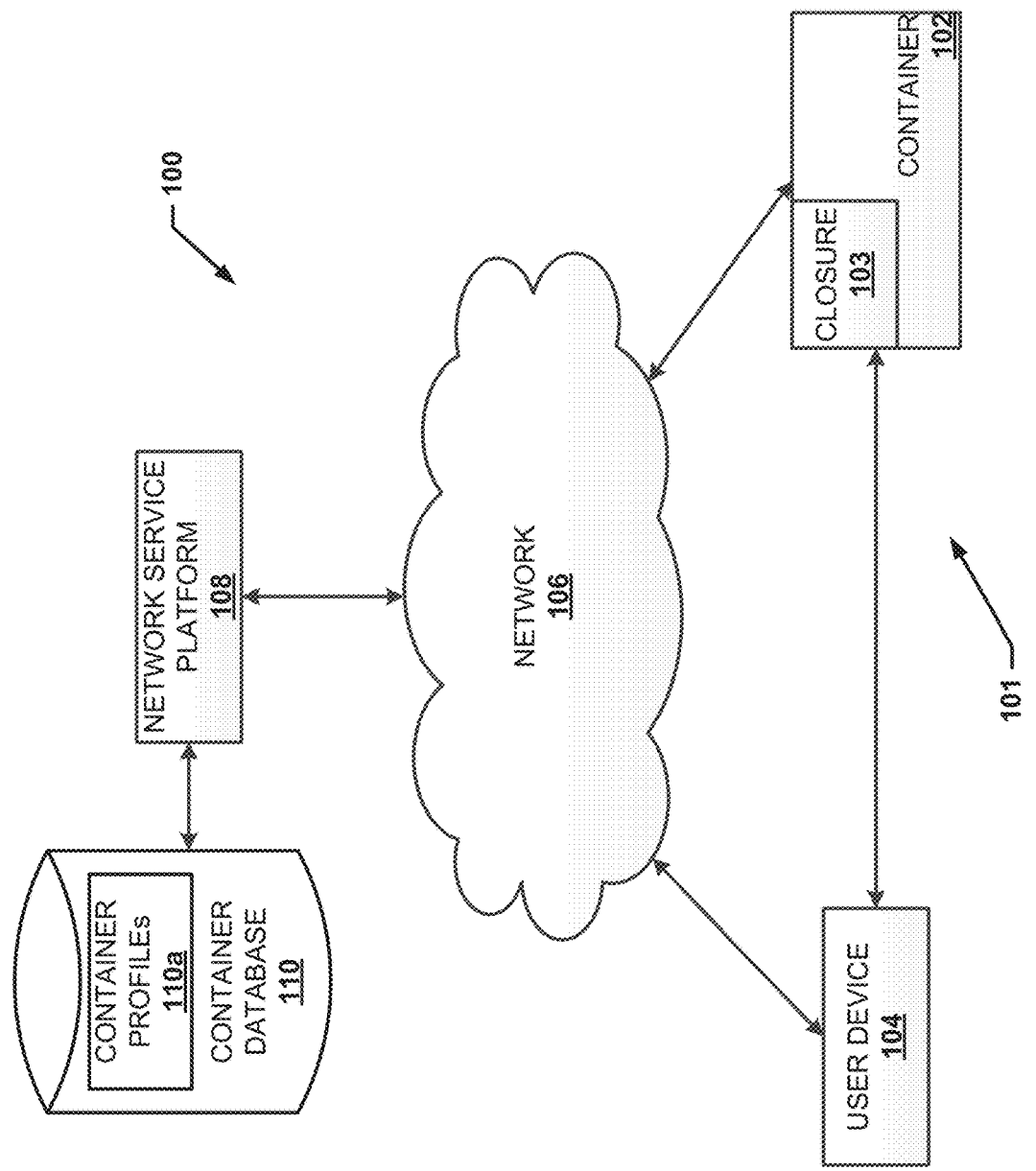
FIG. 1 is a schematic view illustrating an embodiment of a networked container system.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include closure security systems for container systems, as well as methods for providing container security, that may be used to track containers while maintaining the integrity of the product within the container. As discussed above, existing seals and closures for containers do not prevent tampering with the containers and products provided within those containers, as it has been found that the conventional closures and seals are easily reproduced and replaced on tampered-with containers such that it is difficult for legitimate parties (e.g., a container manufacturer, a container filler, a container transporter, a container end user, and other parties) associated with the container to detect tampering with the closure and/or seal. The present disclosure proposes a novel closure security system that provides for the detection of whether a closure subsystem has experienced a tamper event such as, for example, the closure subsystem being removed from the container when closure subsystem is damaged, punctured, drilled, opened with or without out authorization or replaced with or without authorization such that the contents of the container may be used, lost, diluted, stolen, leaked, replaced, contaminated, emptied or otherwise devalued. The container system can provide time and location data associated with any such tampering actions to a user device of a party of interest and/or a network service platform in a network environment accessible from any user device. Additional sensors may also be included in the closure subsystem and/or container system to provide data as to the status of the product being transported or stored in the container, as well as assist in inventory management. Examples of sensors may include depth measurement sensors, temperature sensors, humidity sensors, chemical agent sensors (to ensure authenticity of chemical products), orientation sensors, pressure sensors, movement sensors (e.g., an accelerometer), shock sensors, pH sensors, and/or any other sensors that may be used to detect tampering events and gather information about the container system, the closure subsystem, and/or the product within the container.

Container systems are often sealed on production, following cleaning, as well as after filling them with a product, which is intended to allow any owner of and/or party associated with the container system to ensure there is no container tampering or contamination of the product within by checking that the closure subsystem has not been tampered with (i.e., it is the same closure subsystem as the one that was provided on the container system after production, cleaning, and/or filling.) In various embodiments, the closure subsystem of the present disclosure may include a memory device that may be programmed with data such as a closure identifier, which may be encrypted. This closure identifier may be associated with a container identifier stored in a database, and may be read at any time during the container system's life cycle to confirm it is the expected closure identifier, and therefore the closure subsystem that was used to secure the container that is associated with the container identifier when the container was most recently sealed.

The closure subsystem may include a communication interface to communicate the container identifier to a user device or to a container module included in the container system. The container system may also include a container module that is separate from the closure subsystem and that is configured to communicate the status of the closure subsystem to a user device, a network service platform, and/or a user. In some embodiments, the container module may be separate from the closure subsystem for several reasons. For example, the location of the container may be tracked with the container module. Furthermore, the closure subsystem may be designed to be destroyed during removal, and therefore may lose its ability to communicate. Further still, the closure subsystem may have a small form factor, and this constraint may restrict the battery capacity, antenna performance, and other attributes, which necessitates the separate container module with a separate secondary communication interface where such constraints are no longer present. Further still, the cost of the components (e.g., tamper detection mechanisms) in the closure subsystem may be less expensive than the components (e.g., communication components) in the container module, making the separation of these modules relatively more cost-effective.

As such, in various embodiments, the closure subsystem may include a Near Field Communication (NFC) device, Bluetooth (BT) device, and/or a variety of other short range, low energy, peer-to-peer communication interfaces that would be apparent to one of skill in the art in possession of the present disclosure. For example, the NFC device may contain encrypted information regarding the container system such as the identity of the container system/closure subsystem, a time and a date of filling the container system with product contents, serial numbers for the product, and/or any other information about the product, the container system, the container module, the closure subsystem, and/or any other characteristic of the system components/contents. This information may be available to the BT device and may be communicated to the container module via the BT device and/or any other device with a BT receiver. In some examples, the container module may be used to provide a notification that a closure subsystem has been tampered with by providing that notification over a wide area network using a longer-range communication interface than any of those available in the communication interface of the closure subsystem in response to, for example, the closure subsystem detecting an event, a request for verification on the container system, the closure subsystem, and/or the product provided in the container, and/or in a variety of other scenarios that would be apparent to one of skill in the art in possession of the present disclosure.

Referring now to FIG. 1, an embodiment of a networked container system 100 is illustrated. In the illustrated embodiment, the networked container system 100 includes a container system 102 provided in a physical environment 101. In various embodiments, the container system 102 may include a bottle, a drum, a barrel, a bulk container, a jar, and/or any other containers that may benefit from the teachings of the present disclosure and that would be apparent to one of skill in the art in possession of the present disclosure. The physical environment 101 may be any indoor or outdoor space that may be contiguous or non-contiguous. For example, the physical environment 101 may include a yard, a warehouse, a business, a factory, a transit route, a transport vehicle, and/or any other space known in the art. The physical environment 101 may be defined by geofencing techniques that may include specific geographic coordinates such as latitude, longitude, and/or altitude, and/or may operate within a range defined by a wireless communication signal.

In various embodiments, the container system 102 may utilize a computer system such as the computer system 500 discussed below with reference to FIG. 5, and/or components of the computer system 500. The container system 102 may include communication units having one or more transceivers that enables communication with a closure subsystem 103, discussed in further detail below, a user device 104, a network service platform 108, other container systems, and/or any other device that would be apparent to one of skill in the art in possession of the present disclosure. Accordingly and as disclosed in further detail below, the container system 102 may perform direct or indirect communication with the closure subsystem 103, the user device 104, and/or other container systems. As used herein, the phrase "in communication" (and including variances thereof) is intended to encompass direct communication, as well as indirect communication through one or more intermediary components, and does not require direct physical (e.g., wired and/or wireless) communication and/or constant communication, but rather may include selective communication at periodic or aperiodic intervals, as well as one-time events.

For example, the container system 102 in the networked container system 100 of FIG. 1 may include first (e.g., long-range) transceiver(s) to permit the container system 102 to communicate with a network 106 (e.g., a wide area network (WAN)). The network 106 may be implemented by a mobile cellular network such as, for example, a long-term evolution (LTE) network or other third generation (3G), fourth generation (4G), or fifth-generation (5G) wireless networks. However, in some examples, the network 106 may be additionally or alternatively be implemented by one or more other communication networks such as, but not limited to, a satellite communication network, a microwave radio network, and/or any other communication networks that would be apparent to one of skill in the art in possession of the present disclosure.

The container system 102 and/or the closure subsystem 103 may also include second (e.g., short-range) transceiver(s) to allow the container system 102 and/or the closure subsystem 103 to communicate with each other, the user device 104, and/or other container systems. In the example illustrated in FIG. 1, such second transceivers are implemented by a type of transceiver supporting relatively short-range (i.e., operating at distances that are shorter than those utilized by the long-range transceivers) wireless networking communications. For example, such second transceivers may be implemented by Wi-Fi transceivers (e.g., via a Wi-Fi Direct protocol), Bluetooth® transceivers, Bluetooth® low energy (BLE) transceivers, infrared (IR) transceivers, Near Field Communication (NFC) transceivers, Zigbee® transceivers, radio-frequency identification (RFID) tags, ANT transceivers, Z-Wave® transceivers, and/or any other transceivers that are configured to allow the container system 102 and/or the closure subsystem 103 to intercommunicate via an ad-hoc, a mesh, and/or other wireless network.

In various embodiments below, the user device 104 is described as a mobile computing device such as laptop/notebook computing devices, tablet computing devices, mobile phones, and wearable computing devices. However, in other embodiments, the user device 104 may be provided by desktop computing devices, server computing devices, and/or a variety of other computing devices that would be apparent to one of skill in the art in possession of the present disclosure. The user device 104 may include a communication unit having one or more transceivers to enable the user device 104 to communicate with the network service platform 108 and the container system 102 via the network 106, and/or to communicate with the container system 102 and/or the closure subsystem 103 via a short-range wireless network. Accordingly, and as disclosed in further detail below, the user device 104 may perform direct and/or indirect communications with the container system 102 and/or the closure subsystem 103.

The networked container system 100 also includes and/or may be in communication with a network service platform 108. For example, the network service platform 108 may include one or more server devices, storage systems, cloud computing systems, and/or other computing devices (e.g., desktop computing device(s), laptop/notebook computing device(s), tablet computing device(s), mobile phone(s), etc.). As discussed below, the network service platform 108 may be coupled to a container database 110 that is configured to provide repositories such as a container repository of container profiles 110a for container systems 102 within the physical environment 101. For example, the container database 110 may store a plurality of container profiles 110a that each include a container identifier and information associated with the container (e.g., events, product information, sensor information, and/or any other information that would be apparent to one of skill in the art in possession of the present disclosure). Furthermore, each container profile 110a may include an associated closure identifier that is associated with the container identifier in order to pair, link, or otherwise associate closure subsystems with containers in the container systems.

Figure 2A:
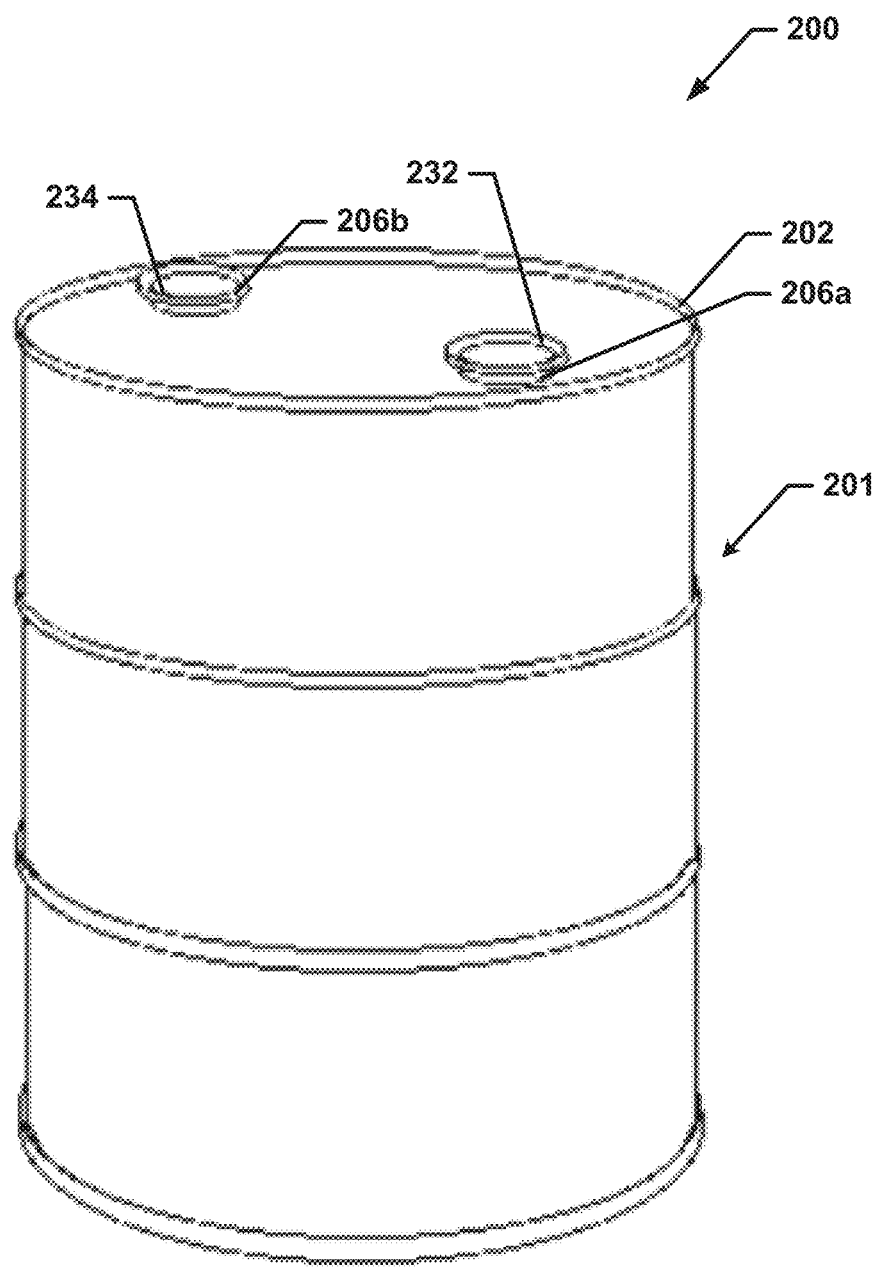
FIG. 2A is a perspective view illustrating an embodiment of a container system that may be provided in the networked container system of FIG. 1.
Figure 2B:
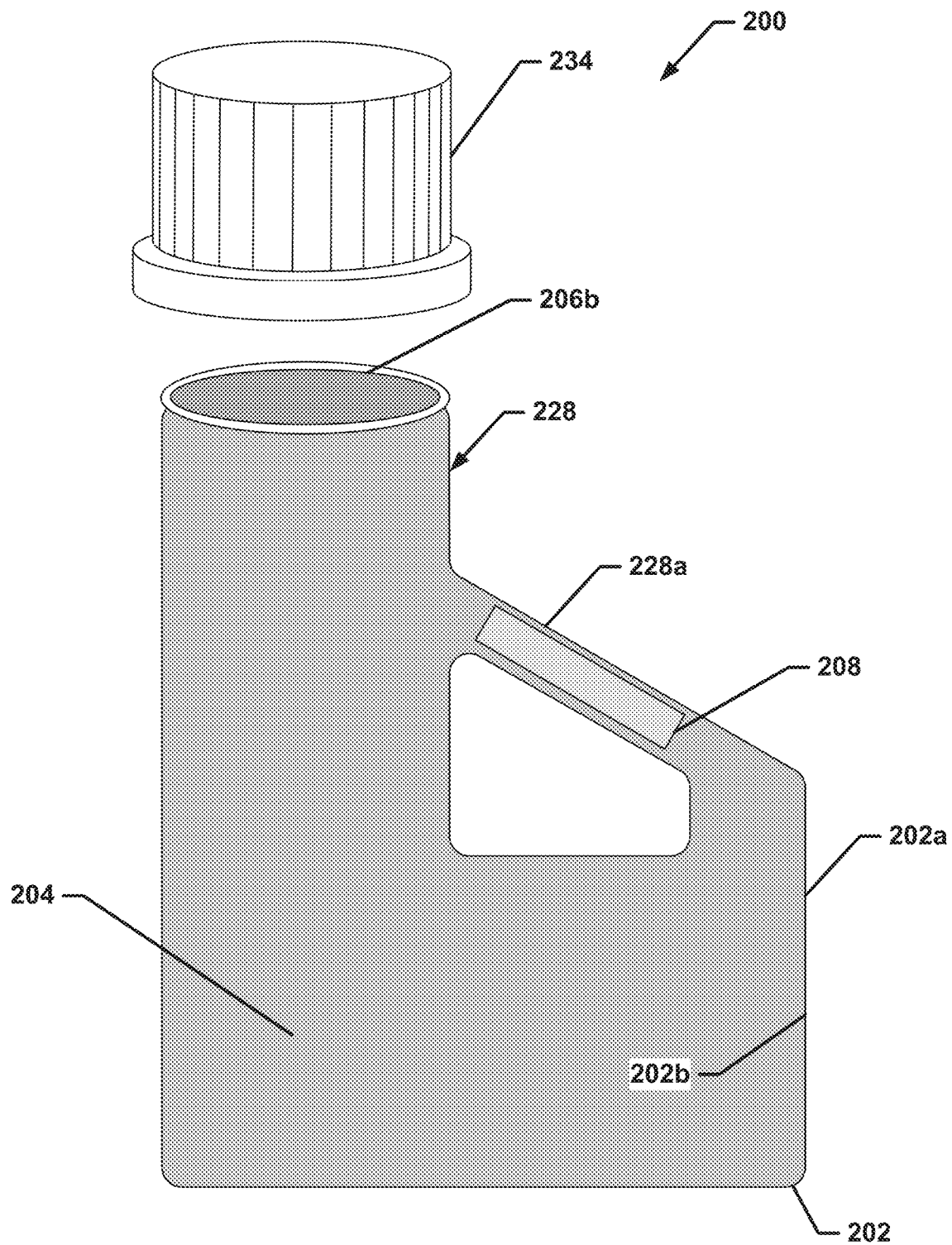
FIG. 2B is a perspective view illustrating an embodiment of a container system that may be provided in the networked container system of FIG. 1.
Figure 2C:
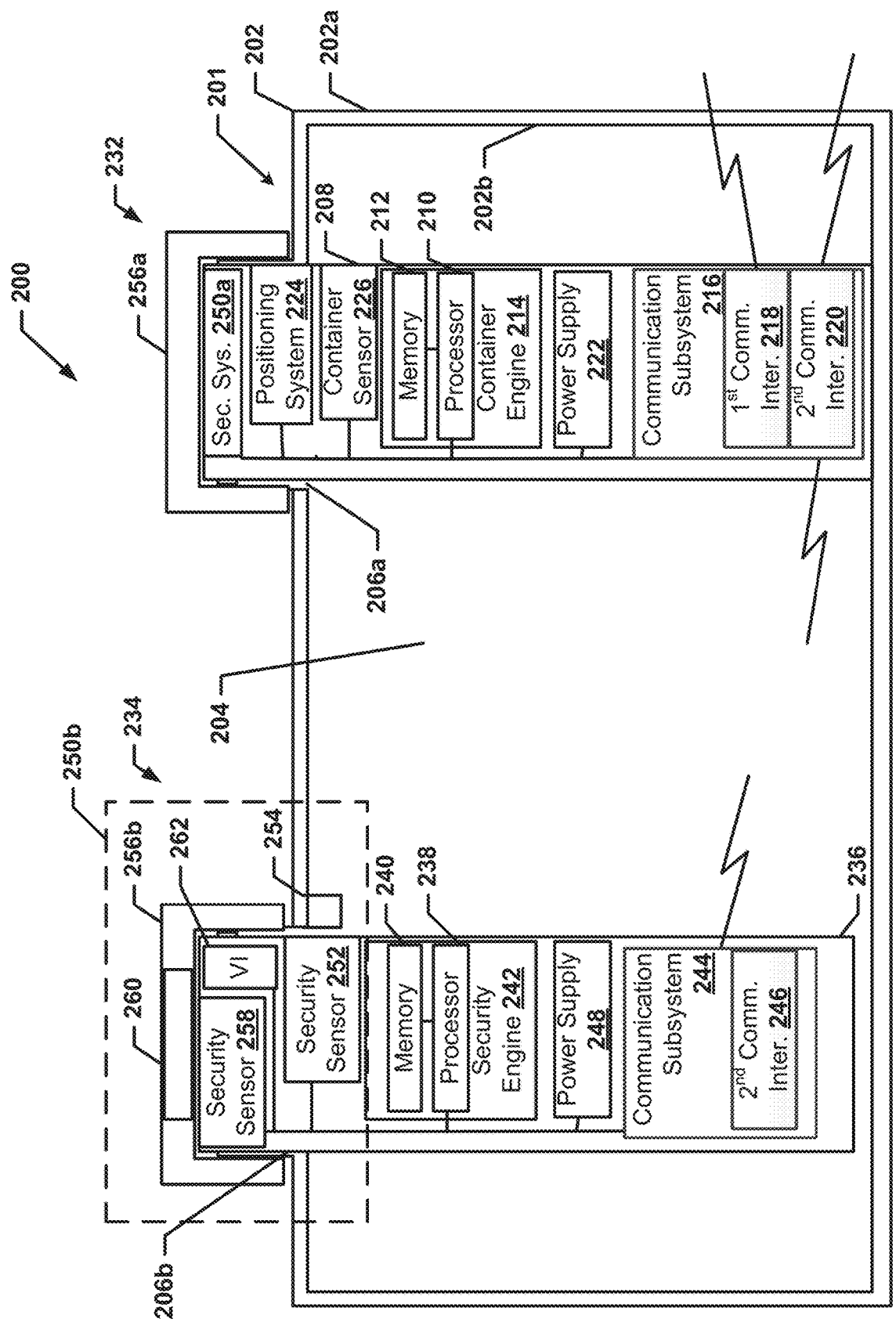
FIG. 2C is a schematic view illustrating an embodiment of the container system of FIG. 2A and FIG. 2B.

Referring now to FIGS. 2A, 2B, and 2C, various embodiments of a container system 200 are illustrated. In various embodiments, the container system 200 may be the container system 102 discussed above with reference to FIG. 1. The container system 200 includes a container 201 having container chassis 202 that defines a container volume 204 and one or more apertures 206a and 206b that may provide for the storage of products in the container volume 204. The container chassis 202 may also house the components of the container system 200, only some of which are illustrated in FIG. 2C. For example, the container chassis 202 may house a container module 208 that includes a processing system 210 and a memory system 212. The memory system 212 is coupled to the processing system 210 and may include instructions that, when executed by the processing system 210, cause the processing system 210 to provide a container engine 214 that is configured to perform the functionality of the container engines and container systems, as well as any other functionality, discussed below.

The container module 208 and/or container chassis 202 may further house a communication subsystem 216 that is coupled to the container engine 214 (e.g., via a coupling between the communication subsystem 216 and the processing system 210). The communication subsystem 216 may include software or instructions that are stored on a computer-readable medium and that allow the container system 200 to send and receive information through the communication networks described herein. For example, the communication subsystem 216 may include a communication interface 218 (e.g., first (e.g., long-range) transceiver(s)) to provide for communications through the communication network 106 as detailed above. In an embodiment, the communication interface 218 may include a wireless antenna that is configured to provide communications via IEEE 802.11 protocols (Wi-Fi), cellular communications, satellite communications, other microwave radio communications, and/or utilizing any other communication techniques that would be apparent to one of skill in the art in possession of the present disclosure. The communication subsystem 216 may also include a communication interface 220 (e.g., second (e.g., short-range) transceiver(s)) that is configured to provide direct communication with user devices, sensors, closure subsystems, and other devices within the physical environment 101 discussed above with respect to FIG. 1. For example, the communication interface 220 may be configured to operate according to wireless protocols such as Bluetooth®, Bluetooth® Low Energy (BLE), near field communication (NFC), infrared data association (IrDA), ANT®, Zigbee®, Z-Wave®, IEEE 802.11 protocols (Wi-Fi), and/or any other wireless communication protocols that allow for the direct device communication described herein.

The container chassis 202 and/or container module 208 also houses a power supply system 222 that may include and/or be configured to couple to a battery. For example, the power supply system 222 may include an integrated rechargeable battery that may be recharged in the container chassis 202 using methods known in the art, and/or may include other power sources that would be apparent to one of skill in the art in possession of the present disclosure. In some embodiments, the user device 104 discussed above with reference to FIG. 1 may be configured to couple to the container chassis 202 (e.g., via a port system that includes a power port) that may provide for the recharging of a rechargeable battery included in the power supply system 222. In various embodiments, port systems may include a data port configured to communicate data between the container module 208 and the user device 104 (e.g., via a cable or other connector.) In other embodiments, the power supply system 222 may be configured to accept a replaceable, non-rechargeable battery while remaining within the scope of the present disclosure as well.

In various embodiments, the container chassis 202 and/or the container module 208 may also include a positioning system 224 that is coupled to the container engine 214. The positioning system 224 may include sensors that are configured to determine their current location and position. For example, the positioning system 224 may include a global positioning system (GPS) receiver, a real-time kinematic (RTK) GPS receiver, a differential GPS receiver, a Wi-Fi based positioning system (WPS) receiver, an accelerometer, and/or a variety of other positioning systems and components that would be apparent to one of skill in the art in possession of the present disclosure. In various embodiments, the container chassis 202 and/or the container module 208 may include one or more container sensors 226 that are coupled to the container engine 214 and configured to provide for the monitoring of conditions of the product and/or the container such as, for example, depth measurement sensors, load sensors, temperature sensors, humidity sensors, chemical agent sensors (e.g., to ensure authenticity of the product), orientation sensors, pressure sensors, movement sensors (e.g., an accelerometer), shock sensors, pH sensors, and/or any other sensors that would be apparent to one of skill in the art in possession of the present disclosure. The container sensors 226 may provide an indication that a tamper event has occurred, as discussed below, to the container and/or any other information about the product, container, and/or closure included with the container that would be apparent to one of skill in the art in possession of the present disclosure.

In various embodiments, the container module 208 may be housed in the container chassis 202 such as, for example, within the container volume 204 defined by the container chassis 202, within a chassis wall of the container chassis 202, and/or affixed or secured to an outside of the container chassis 202. For example, in FIG. 2B, the container system 200 may include a bottle container 228 that has a handle portion 228a within which the container module 208 is disposed. However, as discussed above, the container module 208 may also be attached to an exterior wall 202a that is opposite the container chassis 202 from an interior wall 202b that defines the container volume 204. In yet other embodiments, the container module 208 may be provided as a first closure subsystem 232, as illustrated in FIGS. 2A and 2C, that may include some or all of the components of a second closure subsystem 234, discussed below, such as the security system 250a that includes one or more security sensors and/or the seal 256a illustrated in FIG. 2C. In yet other embodiments where a plurality of containers are being shipped together or another container is within communication range of the container chassis 202, the container module 208 may be housed in one of the containers and provide for communication with the other containers, forming a mesh or other type of local network. In various other embodiments, the container module 208 may be housed in a shipping container and/or shipping platform that includes the container chassis 202.

In various embodiments, the second closure subsystem 234 may include caps, plugs, tops, valves, lids, and/or other closure components that would be apparent to one of skill in the art in possession of the present disclosure. The second closure subsystem 234 may include a closure chassis 236 that is configured, when coupled to the container chassis 202, to prevent movement of the product from the container volume 204 out to the exterior of the container chassis 202 via the aperture 206a and/or 206b. The closure chassis 236 may house a processing system 238 and a memory system 240 that is coupled to the processing system 238 and may include instruction that, when executed by the processing system 238, cause the processing system 238 to provide a security engine 242 that is configured to perform the functionality of the security engines and closure subsystems, as well as any other functionality, discussed below. While a processing system 238 and a memory system 240 are discussed as providing the security engine 242, the security engine 242 may be provided by application specific integrated circuits (ASICs), field-programmable gate arrays (FPGAs), complex programmable logic devices (CPLDs) and/or any other hardware circuit that may be configured to cause a communication interface, discussed below, to provide a notification in response to a security sensor signal being generated by a security sensor.

The closure chassis 236 may further house a communication subsystem 244 that is coupled to the security engine 242 (e.g., via a coupling between the communication subsystem 244 and the processing system 238). The communication subsystem 244 may include software or instructions that are stored on a computer-readable medium and that provide for the sending and receiving of information through the communication networks discussed above. For example, the communication subsystem 244 may also include a communication interface 246 (e.g., second (e.g., short-range) transceiver(s)) that is configured to provide direct communication with user devices, sensors, the container module 208, and other devices within the physical environment 101 discussed above with respect to FIG. 1. For example, the communication interface 246 may be configured to operate according to wireless protocols such as Bluetooth®, Bluetooth® Low Energy (BLE), near field communication (NFC), infrared data association (IrDA), ANT®, Zigbee®, Z-Wave®, IEEE 802.11 protocols (Wi-Fi), and/or other wireless communication protocols that allow for direct communication between devices.

The closure chassis 236 may also house a power supply system 248 that may include or be configured to couple to a battery. For example, the power supply system 248 may include an integrated rechargeable battery that may be recharged in the closure chassis 236 using methods known in the art, and/or may include other power sources that would be apparent to one of skill in the art in the art in possession of the present disclosure. In some embodiments, the user device 104 discussed above with reference to FIG. 1 may be configured to couple to the closure chassis 236 (e.g., via a port system that includes a power port) and, in some cases, recharge a rechargeable battery included in the power supply system 248. In various embodiments, port systems may be provided that include a data port configured to communicate data between the closure subsystem 234 and the user device 104 (e.g., via a cable or other connector.) In other embodiments, the power supply system 248 may be configured to accept a replaceable, non-rechargeable battery while remaining within the scope of the present disclosure as well.

In various embodiments, the closure subsystem 234 may include a closure security system 250b that may include a closure security sensor 252 that is configured to provide a closure sensor signal when the closure subsystem 234 experiences a tamper event such as when the closure subsystem 234 is removed from the aperture 206b. For example, the closure security sensor 252 may be configured to provide a signal to the security engine 242 that indicates that the container chassis 202 and the closure chassis 236 have moved relative to each other (e.g., by some minimum distance) from a first (e.g. sealed) configuration to a second (e.g., unsealed) configuration. In specific embodiments, the container chassis 202 may house a magnet 254, and the closure security sensor 252 may include a Hall effect sensor that is configured to perform at least some of the functionality discussed above, although other sensors are envisioned as falling within the scope of the present disclosure as well.

In another example, the closure security system 250b may include a seal 256b that may include a device or substance that is configured to join the container chassis 202 and the closure chassis 236 together so as to resist them from coming apart and/or to prevent the product in the container volume 204 from passing between the container chassis 202 and the closure chassis 236. The closure chassis 236 may alternatively or additionally house a seal security sensor 258 that is configured to provide a seal sensor signal to the security engine 242 when the seal 256b experiences the tamper event such as when the seal 256b is removed from the closure chassis 236 and the container chassis 202. For example, the seal 256b may include an RFID tag 260 that may store a closure identifier (e.g., a seal identifier that is associated with the container system 200 and/or a container identifier stored in the container database 110) that identifies a container profile 110a. The seal security sensor 258 may include a RFID reader that is configured to provide the seal sensor signal to the security engine 242 when the seal 256 that includes the RFID tag 260 is removed from the closure chassis 236 and container chassis 202 (e.g., by a distance that prevents the reading of the RFID tag 260.) In another example, the seal security sensor 258 may include an NFC reader that may read an NFC tag in the seal 256b that includes an identifier (e.g., associated with the container system 200 and/or a container identifier stored in the container database 110) that identifies a container profile 110a. As such, the NFC reader may be configured to detect when the seal 256b is removed from the closure chassis 236 and container chassis 202 more than a relatively short distance (e.g., less than 10 cm.)

In another example, the seal security sensor 258 and/or the closure security sensor 252 may experience a tamper event when either the seal security sensor 258 and/or closure security sensor 252 is damaged. For example, an unscrupulous party may drill a hole into the closure chassis 236 without removing the closure chassis 236 or the seal 256b. The seal security sensor 258 and/or the closure security sensor 252 may be positioned within the closure chassis 236 and configured to provide a seal sensor signal, a closure sensor signal, and/or lack thereof if any one of the seal security sensor 258 and/or the closure security sensor 252 are damaged such as when the unscrupulous party damages one of the sensors 258 and/or 252 and/or other container sensors 226 while drilling into the closure chassis 236 or otherwise puncturing the closure chassis 236. Furthermore, pressure sensors in the container chassis 202 or closure subsystem 234 may detect a pressure drop in response to such accesses of the container housing (e.g., via drilling through the closure subsystem or container chassis), and that pressure drop may be interpreted as a tampering event as well.

In various embodiments, the closure security system 250b may also include one or more visual indicators 262 that may be provided on the exterior of the closure chassis 236 such that when a security sensor signal is received from the closure security sensor 252, a first visual indicator (e.g., a light emitting diode (LED)) may illuminate to provide a visual indication that the security sensor signal has been generated. Similarly, the first visual indicator or a second visual indicator may illuminate when the seal sensor signal has been generated. However, embodiments in which no visual indications are provided of security sensor signal receipt or generation will fall within the scope of the present disclosure as well. While a specific embodiment of the container system 200 and the closure subsystem 234 is illustrated and described herein, one of skill in the art in possession of the present disclosure will recognize that a wide variety of modification to the components and configuration of the container system 200 and the closure subsystem 234 will fall within the scope of the present disclosure as well.

While the embodiment illustrated in FIG. 2C illustrates a single closure subsystem 234, one of skill in the art in possession of the present disclosure will recognize that a container system may include any number of apertures that need a closure, and thus any number of closure subsystems may be provided with such multi-aperture containers, with each configured to communicate with the container module 208 substantially as discussed below.

Figure 3:
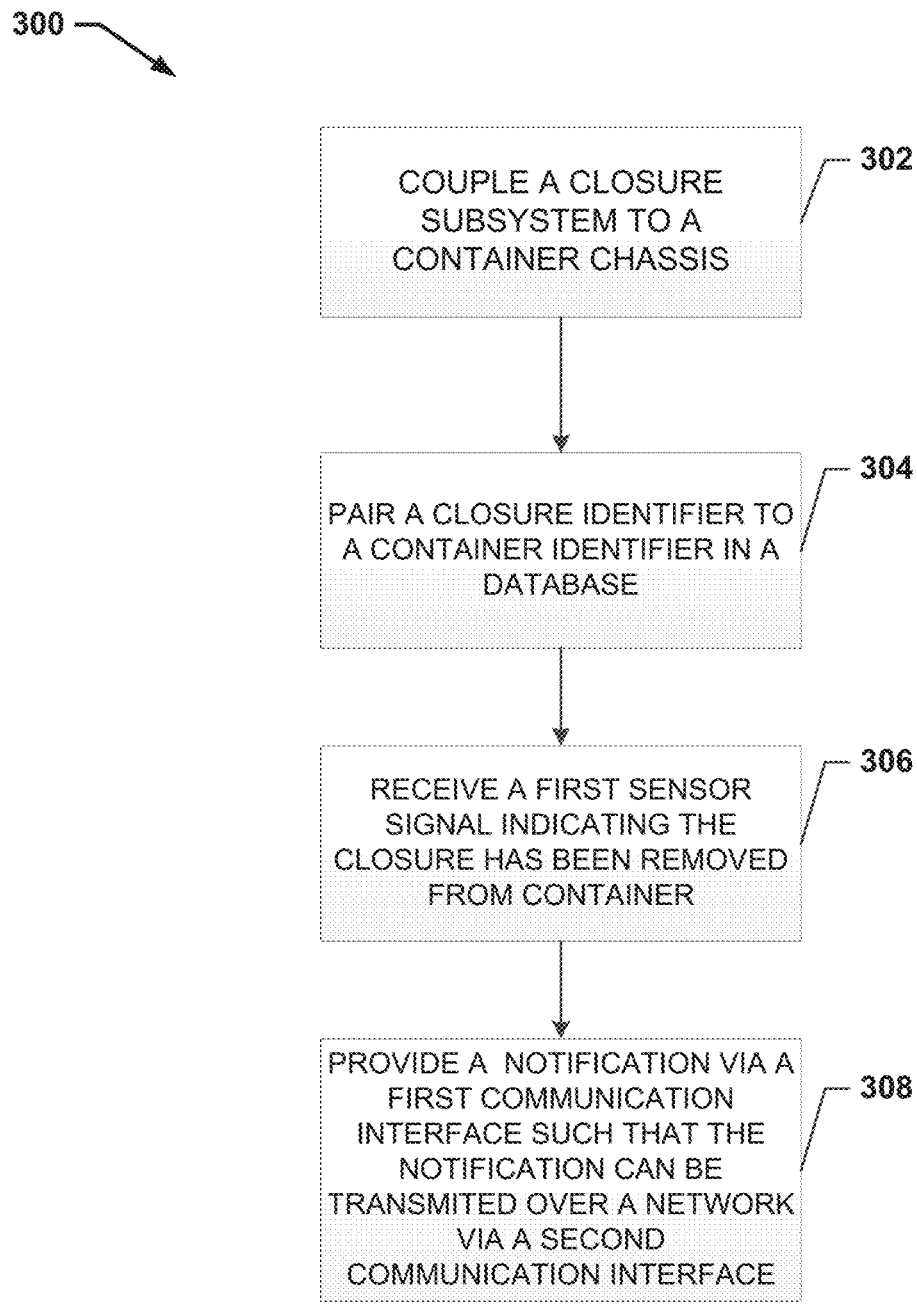
FIG. 3 is a flow chart illustrating an embodiment of a method for providing container security.

Referring now to FIG. 3, a method 300 for providing container security is illustrated. The method 300 begins at block 302 where a closure subsystem is coupled to a container chassis of a container system such that the closure subsystem prevents movement of a material stored in a container volume defined by the container chassis and out to an exterior of the container chassis via a first aperture defined by the container chassis. In an embodiment of block 302, the closure subsystem 234 may be coupled to the container chassis 202. In one example, the closure subsystem 234 may be a plug that is inserted into the aperture 206b and that is configured to prevent movement of materials located in the container volume 204 out of the container chassis 202 via the aperture 206b. In another example, the closure subsystem 234 may be a cap that is fitted over the aperture 206b and that prevents movement of materials located in the container volume 204 out of the container chassis 202 via the aperture 206b. However, the closure subsystem 234 may include a variety of closures that one of skill in the art in possession of the present disclosure would recognize would provide the functionality described herein.

The closure subsystem 234 may be coupled to the container chassis 202 during several stages of a container system's life cycle. For example, a container manufacturer may couple the closure subsystem 234 to the container chassis 202 after manufacturing the container system 200 in order to prevent contaminates from entering the container volume 204 before the container system has reached a container filler (which may be particularly beneficial when the container volume 204 has been sterilized.) Furthermore, a second closure subsystem 234 may also be coupled to the container chassis 202 after the container filler has received the container system 200 and removed the first closure subsystem 234 to fill the container volume 204 with a product in order to prevent contaminants from contaminating the product and/or to prevent the product from escaping (or being removed from) the container volume 204 via the aperture 206b during transport of the container system 200 to an end user. Further still, the end user may remove the second closure subsystem 234 to retrieve the product from the container volume 204, and may replace the second closure subsystem 234 with a third closure subsystem 234 for tracking purposes and/or secure storage of any unused product (e.g., at the end user's facility.) The container chassis 202 may be returned to the container manufacturer or a container cleaning facility when the end user is finished with it, with or without a closure subsystem (e.g., because contamination and loss of the product is not typically a factor once the product has been dispensed from the container volume 206.)

In various embodiments of block 302, the seal 256b may be additionally coupled to the closure chassis 236 and the container chassis 202. As discussed above, the seal 256b may be configured to join the container chassis 202 and the closure chassis 236 together so as to prevent them from being detached and/or to prevent the product from passing between the container chassis 202 and the closure chassis 236.

The method 300 may then proceed to block 304 where at least one closure identifier of the closure subsystem is paired with a container identifier of the container. In an embodiment of block 304, a closure identifier of the closure subsystem 234 may be paired with a container identifier of the container 201. For example, the user device 104 and/or the network service platform 108 may be used to enter the container identifier of the container 201, the closure identifier of the closure subsystem 234, and/or any other information as part of a container profile 110a that is stored in the container database 110 (e.g., local to the user device 104 and/or via the network service platform 108.) In various examples, the closure identifier and/or the container identifier may include tokens, characters, strings, or any identifiers for differentiating a closure subsystem from another closure subsystem and a container from another container. For example, the closure identifier and the container identifier may include internet protocol addresses, network addresses, media access control (MAC) addresses, universally unique identifiers (UUIDs), phone numbers, and/or any other identifier that may be used to identify the closure subsystem 234. In various embodiments, the closure identifier may include a seal identifier of the seal 256 (e.g., an RFID identifier), an identifier of the communication interface 246 housed in the closure chassis 236 (e.g., a UUID of a BT communication interface), identifiers such as serial numbers stored in the memory 240 that provides by the security engine 242, and/or any other identifier that may be electronically provided and, in some cases, encrypted. Similarly, when the container module 208 is housed in the container chassis 202, the container identifier may include any identifier of the communication interfaces 218 and/or 220, an identifier stored in the memory 212 and/or other mass storage device included in the container module 208, a QR code that is attached to the container chassis 202, a serial number, and/or any other identifiers that would be apparent to one of skill in the art in possession of the present disclosure.

In various embodiments, any other information about the container system 200, the container module 208, the closure subsystem 234, the product stored within the container, parties associated with the container, location data, sensor data, and/or other information that would be apparent to one of skill in the art in possession of the present disclosure, may be stored and associated with the closure identifier and the container identifier as part of the container profile 110a.

Figure 4A:
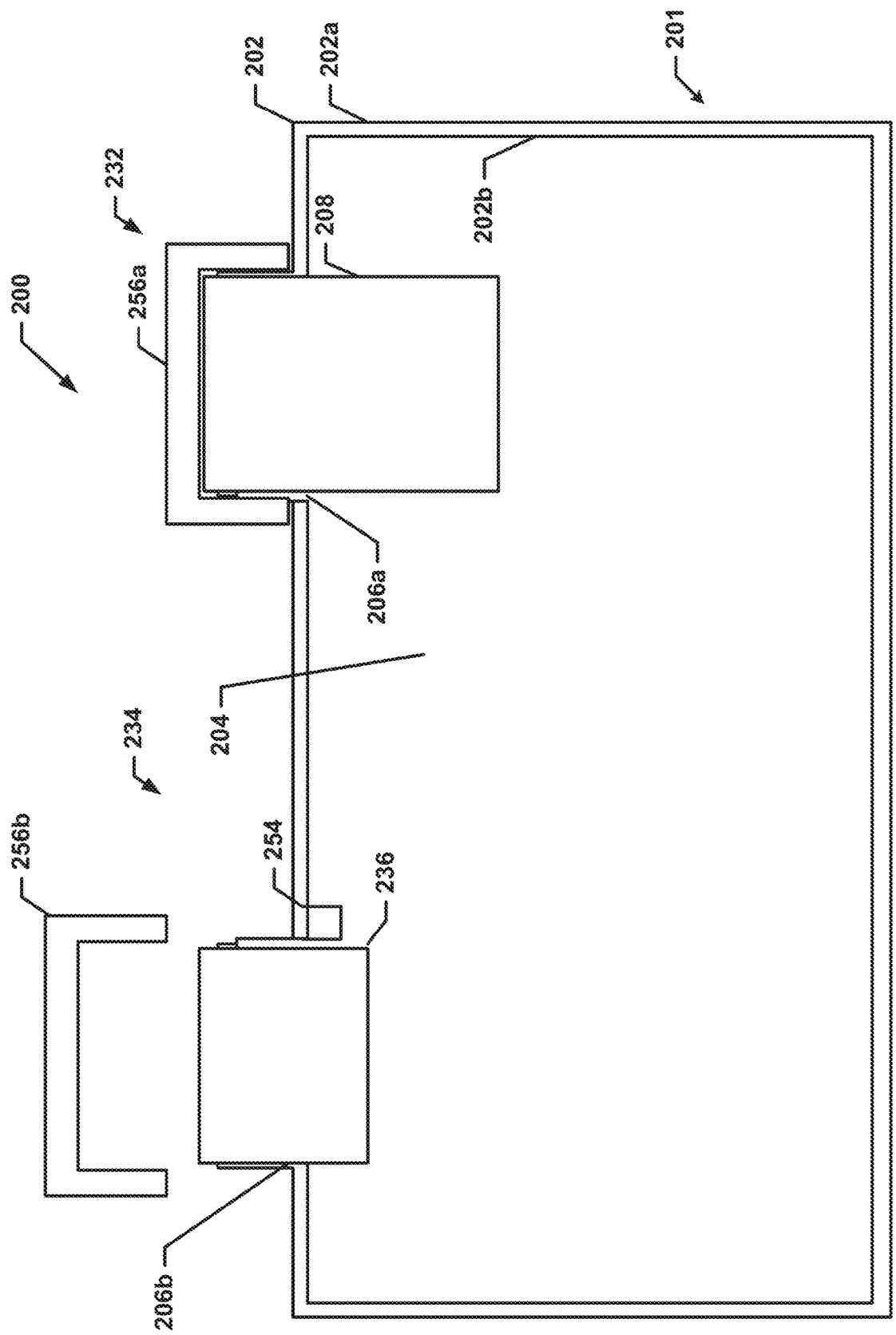
FIG. 4A is a perspective view illustrating an embodiment of the container system of FIGS. 2A and 2C during the method of FIG. 3.
Figure 4B:
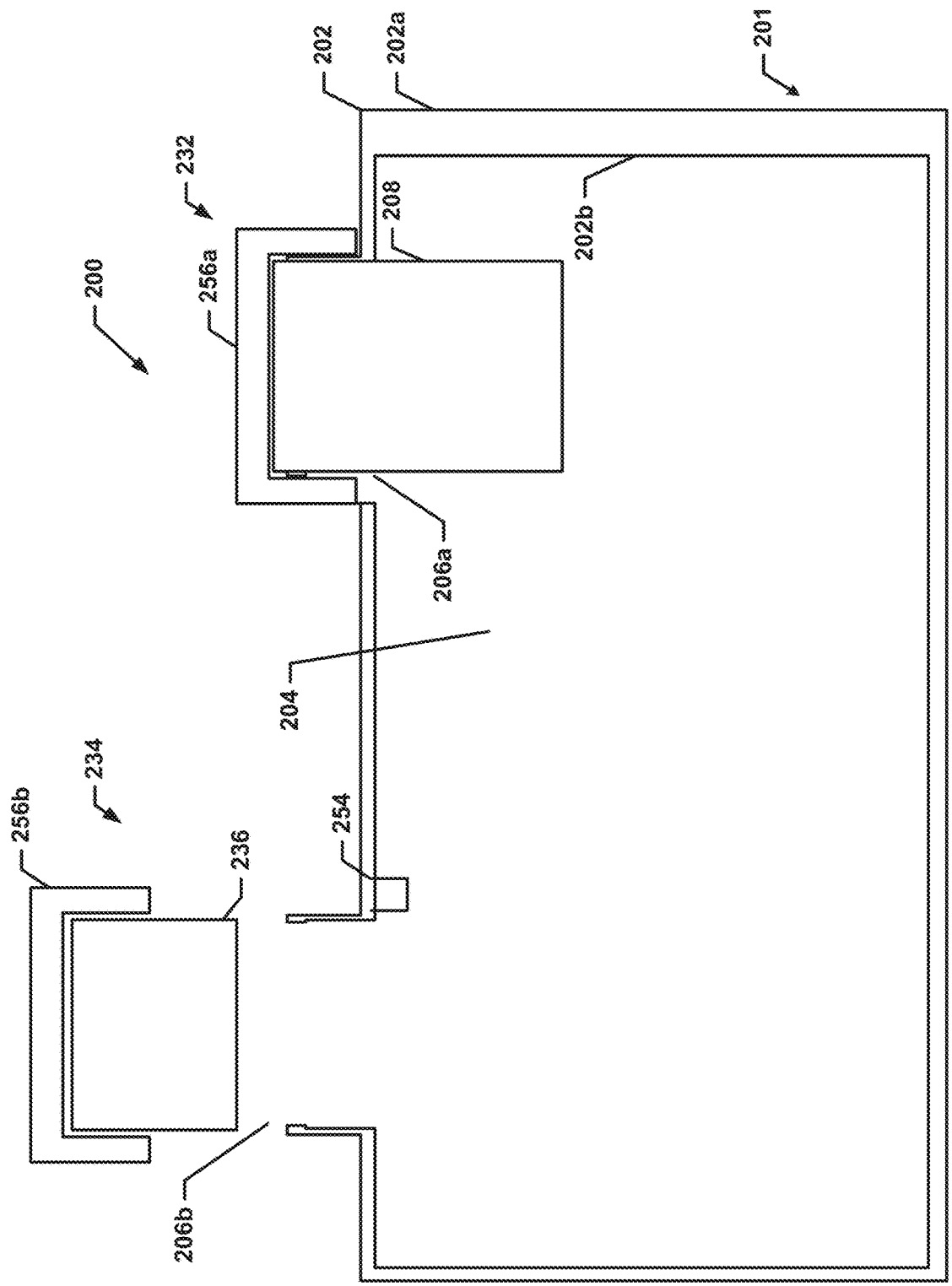
FIG. 4B is a perspective view illustrating an embodiment of the container system of FIGS. 2A and 2C during the method of FIG. 3.

The method 300 may then proceed to block 306 where the closure subsystem detects a security sensor signal. In an embodiment of block 306, the security engine 242 may detect a security sensor signal indicating a tamper event has occurred. For example, and as illustrated in FIG. 4A, the security engine 242 may detect a seal sensor signal provided by the seal security sensor 258 when the seal 256b has been removed from the closure chassis 236 and the container chassis 202 (e.g., by some minimum distance such as an RFID or NFC readable distance). In another example, and as illustrated in FIG. 4B, the closure security sensor 252 may provide the security sensor signal to the security engine 242 when the closure security sensor 252 detects that the closure chassis 236 has been removed from the container chassis 202 (e.g., whether or not the seal 256b has been removed from the closure chassis 236) by some minimum distance. In another example, the closure security sensor 252 and/or the seal security sensor 258 may provide the closure sensor signal and/or the seal security sensor signal, respectively if either of the closure security sensor 252 and/or the seal security sensor 258 are damaged in any way. In various examples, the seal sensor signal and the closure sensor signal may be distinct signals generated by separate sensors, and may be independently generated based on which of the seal 256b and/or the closure is removed, and thus may provide different information. Thus, if the seal 256b were also removed from the closure chassis in FIG. 4B, the seal security sensor 258 would generate a seal sensor signal that is separate from the closure sensor signal. However, in other examples, the seal sensor signal and the closure sensor signal may be the same signal generated by the same sensor. In various other examples, a tamper event may be detected by any of the other container sensors 226 such as a change in pressure by a pressure sensor indicating a puncture in the container chassis 202, a change in pH by a pH sensor indicating a diluted solution, and other sensors discussed above that may provide a security sensor signal to the security engine 242. In various embodiments, the security sensor signal and/or the seal sensor signal may include an identifier that is associated with the closure security sensor 252 and the seal security sensor 258, respectively, and/or identifier(s) associated with the closure subsystem 234 and/or any other information regarding the container subsystem, the product, the parties associated with the container, the container module, and/or other information that would be apparent to one of skill in the art in possession of the present disclosure.

The method 300 may then proceed to block 308 where, in response to detecting the security sensor signal by the closure subsystem, a notification is provided via a first type communication system that the closure subsystem has been moved relative to the first aperture. In an embodiment of block 308, a security sensor signal (e.g., the closure sensor signal from the closure security sensor 252, the seal sensor signal from the seal security sensor 258, and/or any security sensor signals from other sensors 226 that may be housed in the closure chassis) may cause the security engine 242 to generate a notification that is communicated over the communication interface 246 to the communication interface 220 of the container module 208. However, in other embodiments, the communication interface 246 of the communication subsystem 244 may provide the notification to the user device 104 that is within range of the communication interface 246. In other embodiments, the security engine 242 may store the notification in the memory 240 and/or other storage devices included in the closure subsystem 234 until the communication subsystem 244 is within range of a device/communication interface with which the communication interface 246 can communicate.

In examples where the notification is provided to the communication interface 220, the container engine 214 may cause the communication interface 218 to provide the notification over the network 106 to the user device 104 and/or the network service platform 108. In another embodiment, the container engine 214 may store the notification in the memory 212 or other storage device (e.g., in the event that communications between the network 106 and the communication interface 218 are unavailable and/or there is no user device 104 in direct communication with the communication interface 220). For example, if the container system 200, while being transported, is taken to a location where cellular service for the communication interface 218 is unavailable, and then one of the seal 256b and/or the closure chassis 236 is removed from the container system 200 to cause a security sensor signal to be generated, the resulting notification may be stored by the container module 208 until the container system 200 determines it can communicate that signal through the network 106 via an available cellular service.

The notification provided at block 308 may include at least a closure identifier, a seal identifier, and/or any other identifier associated with the closure subsystem 234. However, in other examples, the notification may include a time at which the security sensor generated the signal, a location where that signal was generated (e.g., determined via the positioning system 224), any container sensor data gathered from the container sensors 226, any container module identifiers, any container identifiers, product information, and any other information that would be apparent to one of skilled in the art in possession of the present disclosure.

The notification provided at block 308 may allow the network service platform 108 to use the closure subsystem identifier therein to locate the corresponding container profile 110a in the container database 110 and log any of the information that is included in that notification. In response to receiving the notification at block 308, the network service platform 108 may also provide an alert to any of the parties associated with the container system 200 such as, for example, providing an alert to a user device 104 that is associated with the container system 200, which may notify an administrator of the security event detected by the closure security system 250b. In other embodiments, when the user device 104 first receives the notification, the user device 104 may generate an alert through a user interface such as, for example, a graphical user interface alert, a vibration, a sound, and/or any other alert that would be apparent to one of skill in the art in possession of the present disclosure. The user device 104 may also provide the notification to the network service platform 108 to cause the network service platform to retrieve other information associated with the received closure subsystem identifier, and/or cause the network service platform 108 to log the security event in the container profile 110a for the container system 200 such that other parties and user devices 104 associated with the container system 200 may receive the alert as well.

In various embodiments, the security engine 242 may also cause the visual indicator 262 included in the closure security system 250b to activate and provide a visual indication on the exterior of the closure chassis 236 of the security event. For example, one or more LEDs may illuminate (or shut off) in response to one or more security sensor signals generated by the seal security sensor 258 and/or the closure security sensor 252. For example, a first LED may illuminate upon the security engine 242 receiving a closure sensor signal, and/or a second LED may illuminate in response to the security engine 242 receiving a seal sensor signal. In various embodiments, the visual indicator 262 may be provided in the container module 208 and/or other locations on the container chassis 202.

In various embodiments, the container sensors 226, such as a depth sensor, pressure sensor, and/or level sensor, may be used in conjunction with the closure security system 250a and/or 250b to perform a variety of other functions besides security. For example, the depth and/or pressure sensors of the container system 200 may be configured to cause the container module 208 to provide an indication to the network service platform 108 and/or user device 104 of a replacement of supply event (e.g., an indication to refill the product) and/or a collection event (e.g., collect the container system 200 for cleaning and reuse). Many of the container systems 200 may undergo multiple filling and re-use cycles and the automatic triggering of a collection notification once emptied and location of the container may be used to improve the reuse of the container system 200. In other examples, additional sales of the product within the container may be automated when the container system 200 is emptied and may be indicated by a level sensor that is activated once the closure security system 250a detects a tamper event. The level sensor may be an active sensor, and thus only activated after a tamper event is detected such that the level sensor does not drain the battery included in the power supply system 222 and/or 248.

In a specific example utilizing the systems and methods of the present disclosure, the closure in the container system that includes the closure chassis 236 and/or the seal 256b may include an RFID tag or similar intelligent tag that stores encrypted information including an encrypted identifier which is difficult to replicate or replace. A security sensor (e.g., closure security sensor 252 and/or seal security sensor 258) may be included in the closure chassis 236 and/or container chassis 202, and may include an RFID reader, which may read the RFID tag to verify nothing has changed with the seal 256b and/or the closure chassis 236 (i.e., verify that the RFID tag has not been replaced with another RFID tag that includes a different RFID identifier than what is expected and/or that the original RFID tag has been continually present). The RFID reader may be configured to broadcast the encrypted information included in the RFID tag to a standard interface such as a BT communication interface or a Wi-Fi communication interface housed within the closure chassis 236 and/or the container chassis 202 such that a dedicated identification reader (e.g., RFID reader) is not needed by an end user, and rather the end user can use a conventional mobile phone or other user device to determine whether a tamper event occurred with the container. This reduces barriers to entry and costs as the specific RFID reader is not required to receive information from the container system 200.

Thus, systems and methods have been described that provide for detection of closure subsystem removal from a container system, as well as the provisioning of a notification of a security event to parties that have an interest in that container system. The closure subsystem may include one or more security sensors that generate a security sensor signal when at least one of a closure or a seal is removed from the container system. The closure subsystem may communicate this security event to a container module via a second type communication interface such that the container module can communicate the event through a first type communication interface that has a longer range than the second type communication interface. The first type communication interface, because of its longer range, typically has greater power requirements, and thus is typically more expensive and greater in size and weight due to the need for larger batteries and circuits. Therefore, embodiments of the present disclosure provide a cost effective and power efficient system in situations where there are multiple apertures in the container system that need a disposable closure subsystem, situations where the container module does not include a security system, and/or situations where the container module is located within the container volume or exterior to the container chassis. As such, the container system may provide security for the container by monitoring and reporting theft of a product stored therein, detecting and notifying events that may cause contamination of the product or container, and/or detecting and notifying any other events that occur to the container through its life cycle.

Figure 5:
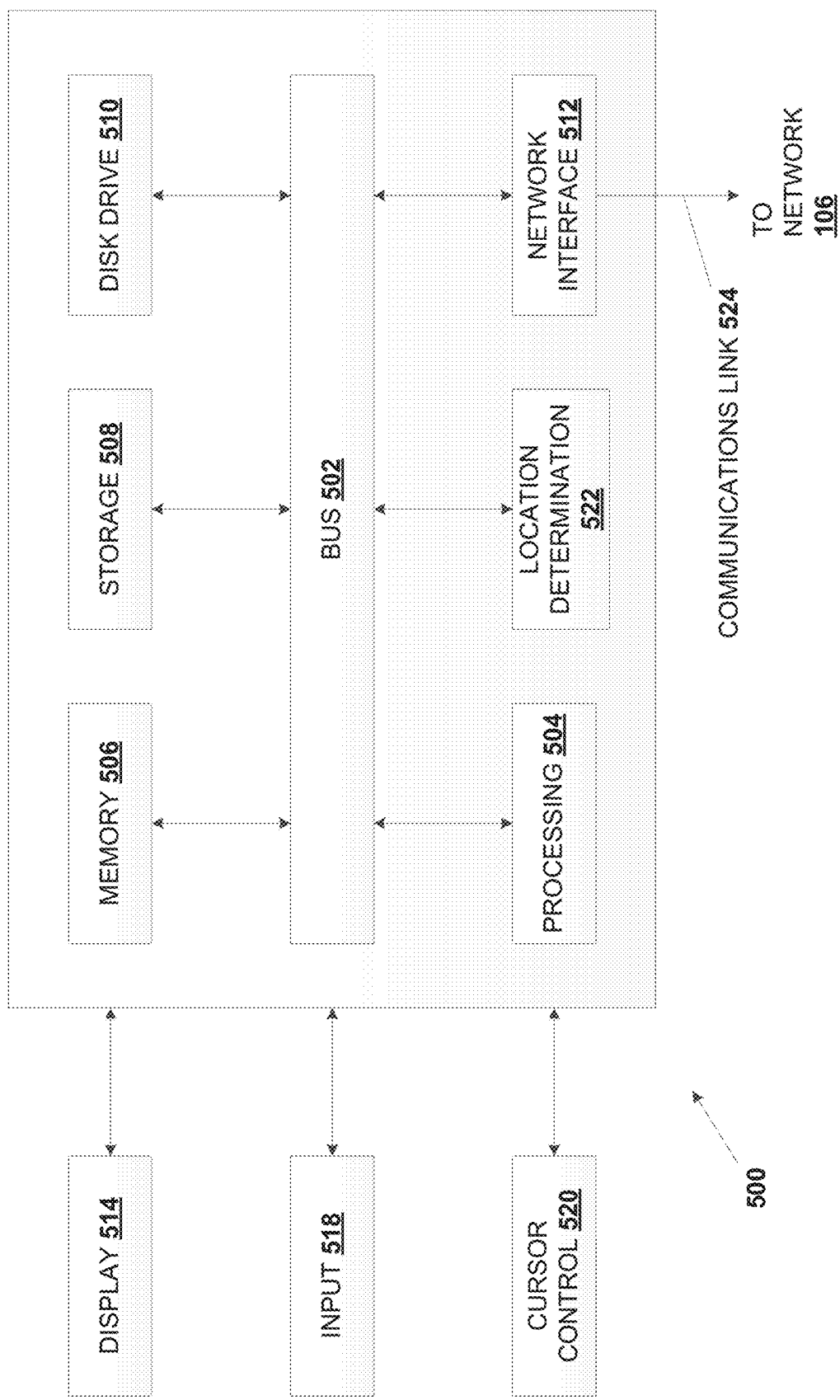
FIG. 5 is a schematic view illustrating an embodiment of a computer system.

Referring now to FIG. 5, an embodiment of a computer system 500 suitable for implementing, for example, the container system 102 and 200, the user device 104, and/or the network service platform 108, is illustrated. It should be appreciated that other devices utilized in the container network system discussed above may be implemented as the computer system 500 in a manner as follows.

In accordance with various embodiments of the present disclosure, computer system 500, such as a computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), and/or a location determination component 522 (e.g., a Global Positioning System (GPS) device as illustrated, a cell tower triangulation device, and/or a variety of other location determination devices known in the art.) In one implementation, the disk drive component 510 may comprise a database having one or more disk drive components.

In accordance with embodiments of the present disclosure, the computer system 500 performs specific operations by the processor 504 executing one or more sequences of instructions contained in the memory component 506, such as described herein with respect to the container system 102 and 200, the user device 104, and/or the network service platform 108. Such instructions may be read into the system memory component 506 from another computer readable medium, such as the static storage component 508 or the disk drive component 510. In other embodiments, hard-wired circuitry may be used in place of or in combination with software instructions to implement the present disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 500. In various other embodiments of the present disclosure, a plurality of the computer systems 500 coupled by a communication link 524 to the network 106 (e.g., such as a LAN, WLAN, PTSN, and/or various other wired or wireless networks, including telecommunications, mobile, and cellular phone networks) may perform instruction sequences to practice the present disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Figure 6:
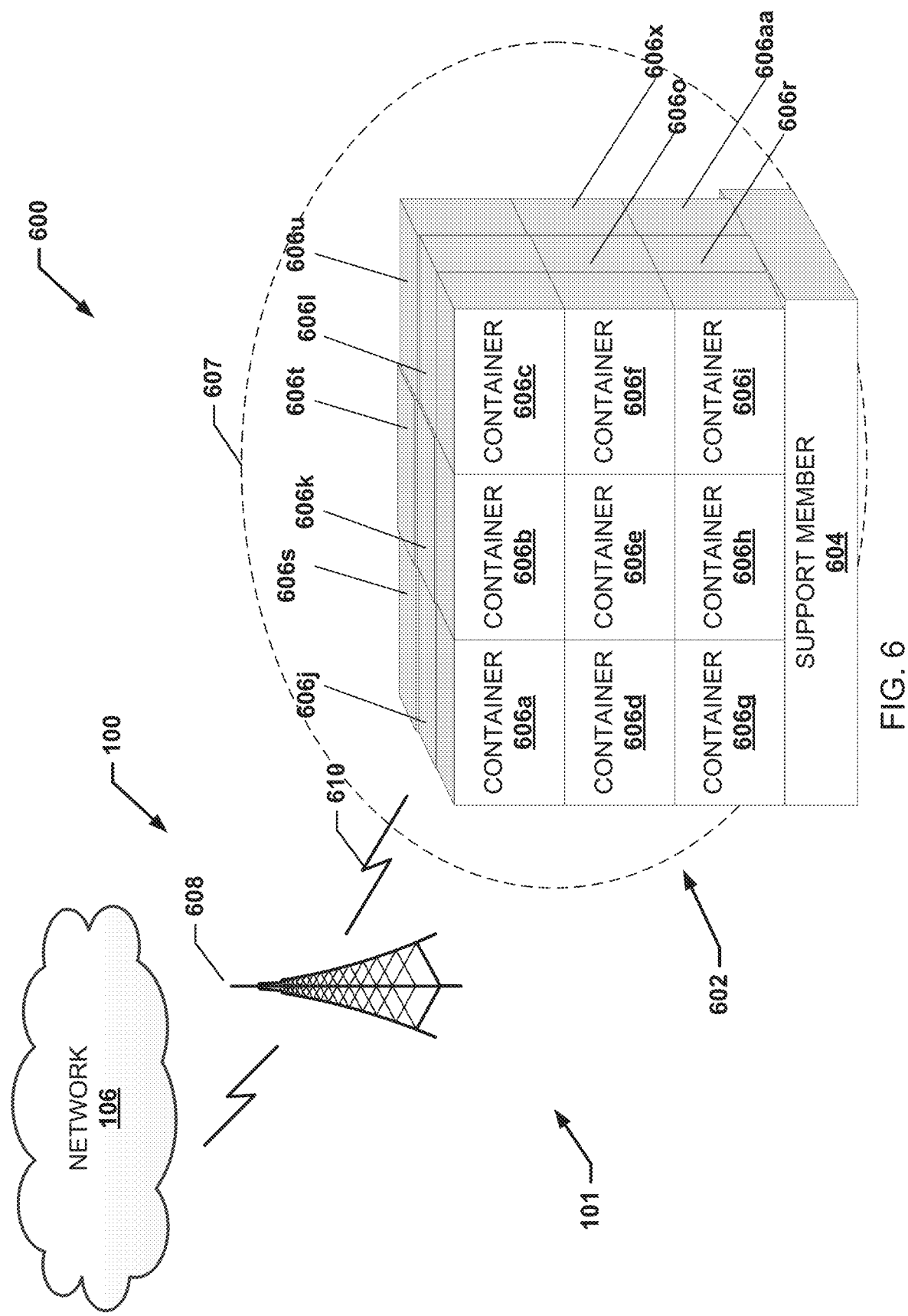
FIG. 6 is a schematic view illustrating an embodiment of a networked container system that includes a container network.

Referring now to FIG. 6, a networked container system 600 is illustrated. In some embodiments, the networked container system 600 may be provided by the networked container system 100 of FIG. 1 such that the networked container system 600 includes some or all of the networked container system 100. For example, the networked container system 600 may include the network 106 that may be coupled to the user device 104, the network service platform 108, and the container database 110 illustrated in FIG. 1. The networked container system 600 may also include a delivery system 602 that may be provided in addition to or in place of the container system 102. For example, the delivery system 602 may include a support member 604 and a plurality of container systems 606a-606aa, each of which may be similar to the container system 102/200 of FIGS. 1, 2A, 2B, and 2C. In an embodiment, the container systems 606a-606aa and/or the support member 604 may be configured to generate a container network 607 such as, for example, an ad hoc network provided by a wireless mesh network, a mobile ad hoc network, and/or any other decentralized network and/or local area network that would be apparent to one of skill in the art in possession of the present disclosure. While in the illustrated embodiment the delivery system 602 includes the support member 604, in various embodiments the support member 604 may be omitted. Furthermore, while in the illustrated embodiment the delivery system 602 includes twenty-seven container systems 606a-606aa, one of skill in the art will recognize that the delivery system 602 may include more or fewer container systems than those illustrated, while including at least two container systems, or at least one container system and a support member 604. Similarly, the networked container system 600 may include at least two container systems and/or one or more delivery systems 602. Furthermore, one or more delivery systems and/or container systems that are not included in the delivery system 602 may be included in the container network 607. Similarly, one or more of the container systems 606a-606aa and/or the support member 604 may not be included in the container network 607.

In an embodiment, the networked container system 600 is implemented to form part of a cellular network such as, for example, a 3G, 4G, or 5G network, other 3GPP-based cellular networks, and/or a cellular network based on a variety of other cellular standards that will be apparent to one of skill in the art in possession of the present disclosure. As such, the networked container system 600 may utilize a base station 608 as described below. In this regard, in many of the examples discussed below, the discussion of FIG. 6 describes the networked container system 600 providing a cellular network. However, in some examples, the networked container system 600 may be additionally or alternatively implemented to form part of a satellite communication network, a microwave radio network, and/or other wireless networks known in the art (e.g., a wireless network that operates according to the IEEE 802.11 protocols (Wi-Fi)). As such, the base station 608 may be replaced by a satellite, an access point, and/or any other communication network components that provide access to the network 106.

In an embodiment, the base station 608 may include, may be a component of, and/or may be referred to as, a cell, a base node, a Node B (NB), an eNode B (eNB), gNodeB (gNB), or a Home eNB (HeNB). For example, the base station 608 may include suitable logic, circuitry, interfaces, memory, and/or code that enable communications with the delivery system 602, the user device 104, and/or another base station, via wireless interfaces utilizing one or more radio transceivers (e.g., the communication interface 218 of the container systems 606a-606aa). In some cases, the base station 608 may be mobile (e.g., mobile base stations at ground level, mobile base stations at flight altitudes, mobile naval-based base stations, etc.), in which case its position information may be dynamic.

In different embodiments, the base station 608 may be provided by macrocell base stations, microcell base stations, picocell base stations, femtocell base stations, and/or base stations having other cell sizes as well. For example, a macrocell base station may provide a coverage area over a radial range of up to tens or hundreds of kilometers, a picocell base station may provide coverage over a radial range in the hundreds of meters, and a femtocell base station may provide coverage over a radial range in the tens of meters. In FIG. 6, the base station 608 may provide the signal 610. As will be understood by one of skill in the art in possession of the present disclosure, the coverage area of a base station may be different in different environments, at different altitudes, and at different frequency bands. For example, the base station 608 may have a smaller coverage area on a rainy day than that same base station on a sunny day due to, for example, the attenuation of signals by rain. Furthermore, when altitudes are taken into consideration, the coverage area provided by the base station 608 may more appropriately be referred to as a coverage volume, with different coverage areas at different altitudes. As used herein, the coverage area and coverage volume may be referred to more generally as a coverage region, where the region may be two-dimensional (i.e., a coverage area) or three-dimensional (i.e., a coverage volume).

In an embodiment, the networked container system 600 includes the delivery system 602 having a plurality of container systems 102 (e.g., container systems 606a-606aa), and may additionally include the support member 604. In various embodiments, the support member 604 may be a pallet, a box, a crate, a shipping container, and/or any other secondary container system that would be apparent to one of skill in the art in possession of the present disclosure as providing for the housing or supporting the container systems 606a-606aa. As such, in various embodiments, the support member 604 may include the container module 208 discussed above |(or a portion thereof) such that the support member 604 includes at least the communication subsystem 216 and the container engine 214. As a result, in some embodiments the container systems 606a-606aa may or may not include the container modules 208, and may include only the closure subsystem 234 and/or the container module 208 that includes the communication interface 220 and does not include the communication interface 218. While a specific networked container system 600 has been illustrated and described, one of skill in the art in possession of the present disclosure will recognize that the teachings of the present disclosure will be beneficial for a variety of networked container systems and, as such, a wide variety of modifications to the number, types, orientations, and configurations of devices and systems in the networked container system 600 will fall within the scope of the present disclosure as well.

Figure 7:
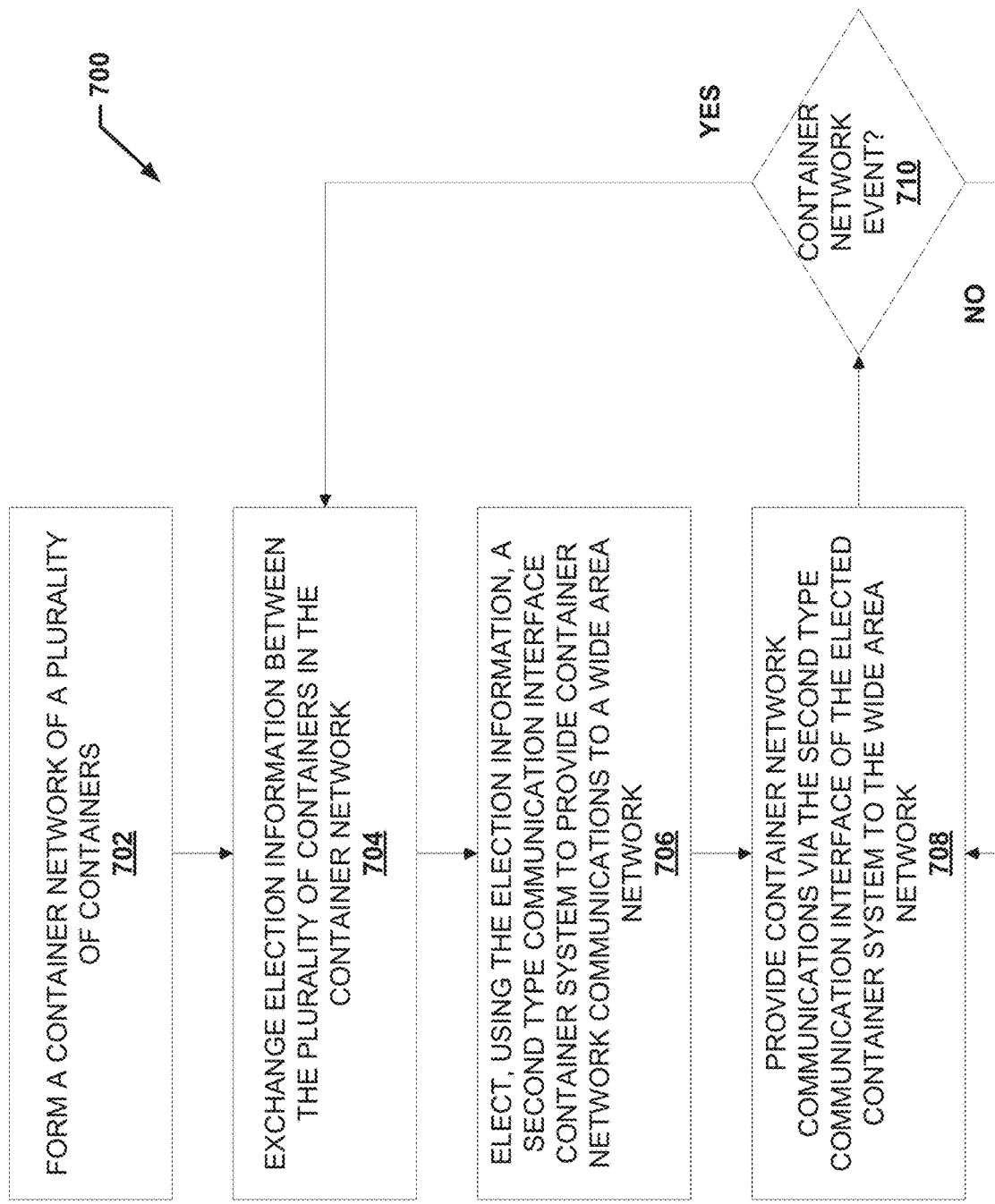
FIG. 7 is a flow chart illustrating an embodiment of method for container communications with a network.

Referring now to FIG. 7, a method 700 for container communication with a network is described. As discussed above, a single container system (e.g., the container system 102 of the networked container system 100) may include a container module that may communicate notifications such as security events, as well as other container information such as container identifiers and sensor information about the container system, closures, and/or contents of the container, to a network service platform (e.g., the network service platform) such that interested parties can monitor the container, its contents, and/or its surroundings while the container system is being transported, stored, and/or during some other stage in a container system life cycle. However, using a long-range communication interface in the container module to communicate notifications and/or container information to the network service platform requires a large amount of energy from the power supply of the container module. Thus, continued usage of the long-range communication interface where the power supply is provided by a battery or other limited power supply may result in depleting the stored energy in the battery before the container system arrives at its destination.

Furthermore, when container systems are transported and/or stored, the container systems are often stored together in a delivery system, or stacked in a stacked configuration. As a result of the grouping together of container systems in a delivery system, or the grouping together of many delivery systems, the long-range communication signals provided between base stations and a long-range communication interface in at least some of the container modules may be blocked, attenuated, and/or otherwise interfered with as a result of the material provided for the chassis of the container systems in the delivery system(s), the material stored in the container systems in the delivery system, a location of a particular container system within the delivery system(s), and/or via any other interference that would be apparent to one of skill in the art in possession of the present disclosure. For example, a container module that is provided in a container system that includes a metal drum, and that is provided in the middle of a stacked configuration of metal drums, may not be able to use its long-range cellular communication interface due to the attenuation of the cellular signal by the metal drums located around it. As illustrated in FIG. 6, the container systems 606n and 606q may not be able to communicate with the base station 608 because they are surrounded in the delivery system 602 by other container systems that may be made of, or may hold, material that interferes with the signal 610.

The systems and methods of the present disclosure provide for a networked container system that allows the container systems within a physical environment to form a container network (e.g., a mesh and/or ad hoc network) using communication interfaces that are "short-range" and that use less energy relative to the "long-range" communication interfaces provided in the container modules that communicate with the network service platform via a wide area network. The container modules in the container systems, and/or a support member that holds those container systems, may elect which container module(s) will provide a long-range communication interface for the container network, and that election of the container module may be determined based on a variety of election factors. Once elected, any of the containers modules in the physical environment may communicate with the wide area network through the elected container module using connections provided via the container network. For example, if a first non-elected container module cannot communicate with the elected container module directly, the first non-elected container module may provide its notifications and/or container information through a second non-elected container module that is in direct communication, or indirect communication with, both the non-elected container module and the elected container module. The networked container system may change the election of a currently elected container module such that the currently elected container module becomes a non-elected container module, and a non-elected container module becomes a currently elected container module during the life cycle of the container system and while container systems are moving into and out of the container network.

Furthermore, once the container network is established, the container modules in the container systems, and/or a support member that holds those container systems, may elect other container components included the container systems besides the long-range communication interface that provide common functions that result in redundancies. That election of the container module may be determined based on a variety of election factors and information and cause non-elected components to be powered down or to be provided less power. For example, each container system may include an external temperature sensor that measures the temperature external to its container system. Once included in the container network, the container systems within that container network may assume that the container systems are all within the same environment, and thus do not require each external temperature sensor to measure the external temperature. As such, non-elected external temperature sensors may be provided less power or may be powered down. Similarly, positioning systems included on each container system in the container network may be redundant or experience poor signal quality, and thus one or more positioning systems may be elected to represent the location for the container network and the included container systems while other non-elected positioning systems are powered down or are provided less power.

Figure 8A:
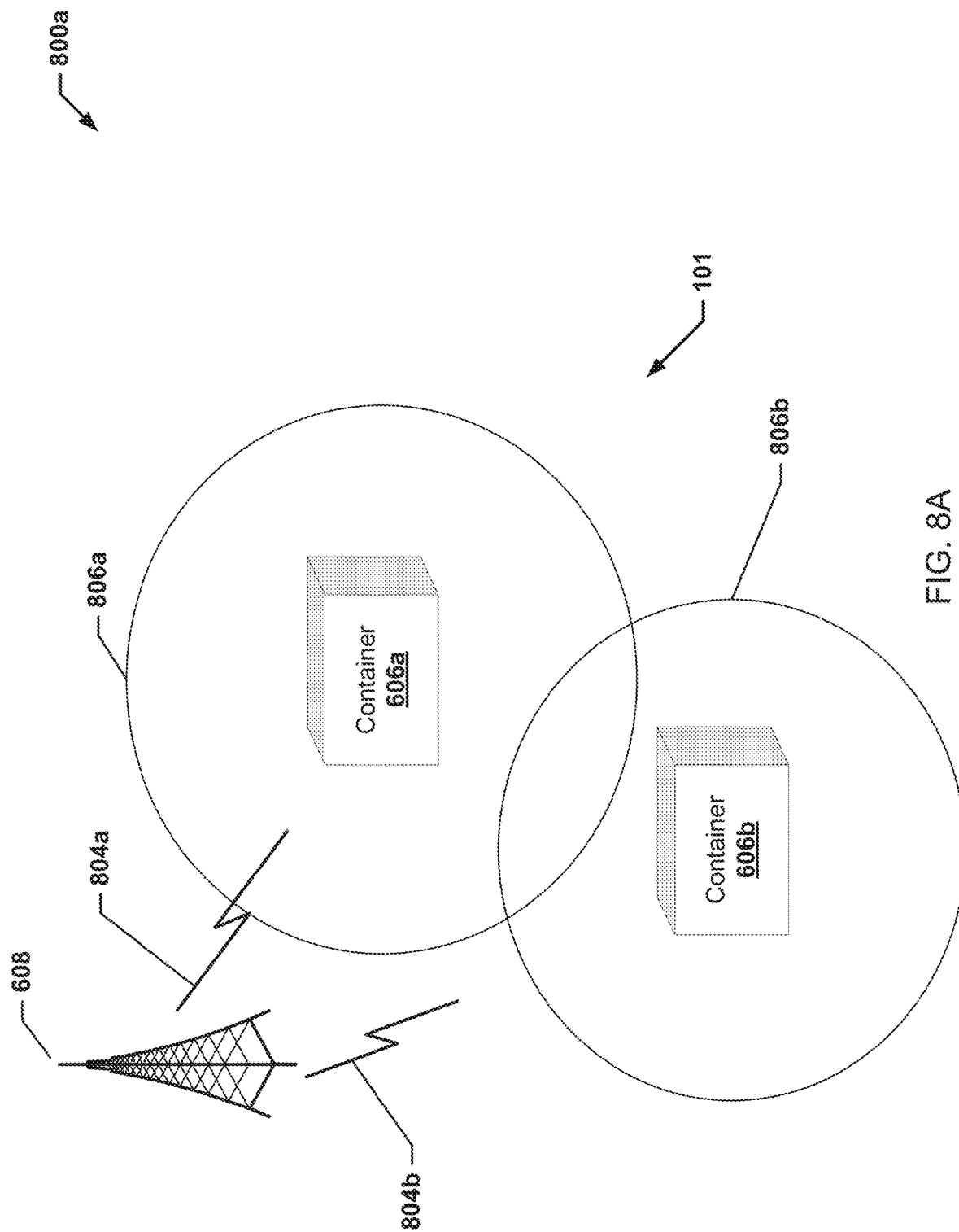
FIG. 8A is a schematic view illustrating an embodiment of the networked container system of FIG. 6 during the method of FIG. 7.

The method 700 begins at block 702 where a container network is formed by a plurality of container systems. Prior to block 702 and with reference to the networked container system 800a of FIG. 8A, the container system 606a and the container system 606b may be located in the physical environment 101. While only the container system 606a and 606b are illustrated in the examples provided in the FIGS. 8A-8C, one of skill in the art will recognize that any of the container systems 606c-606aa and/or the support member 604 may be provided as well or the container system 606b may be replaced with the support member 604 while remaining within the scope of the present disclosure. The container module 208 in the container system 606a may include a communication interface 218 that establishes a connection 804a to communicate with the base station 608, and a communication interface 220 that provides a coverage area 806a to communicate with other devices in the physical environment 101. Similarly, the container module 208 in the container system 606b may include a communication interface 218 that establishes a connection 804b to communicate with the base station 608, and a communication interface 220 that provides a coverage area 806b to communicate with other devices in the physical environment 101. As discussed above, having both communication interfaces 218 in each of the container systems 606a and 606b communicating with the base station 608 is inefficient. However, in the networked container system 800 in FIG. 8A, the container system 606a is not in the coverage area 806b of the container system 606b, and, likewise, the container system 606b is not in the coverage area 806a of the container system 606a. As such, the only way for each of the container system 606a and 606b to communicate with the networked service platform 108 is via the respective connections 804a and 804b provided by their respective communication interfaces 218.

Figure 8B:
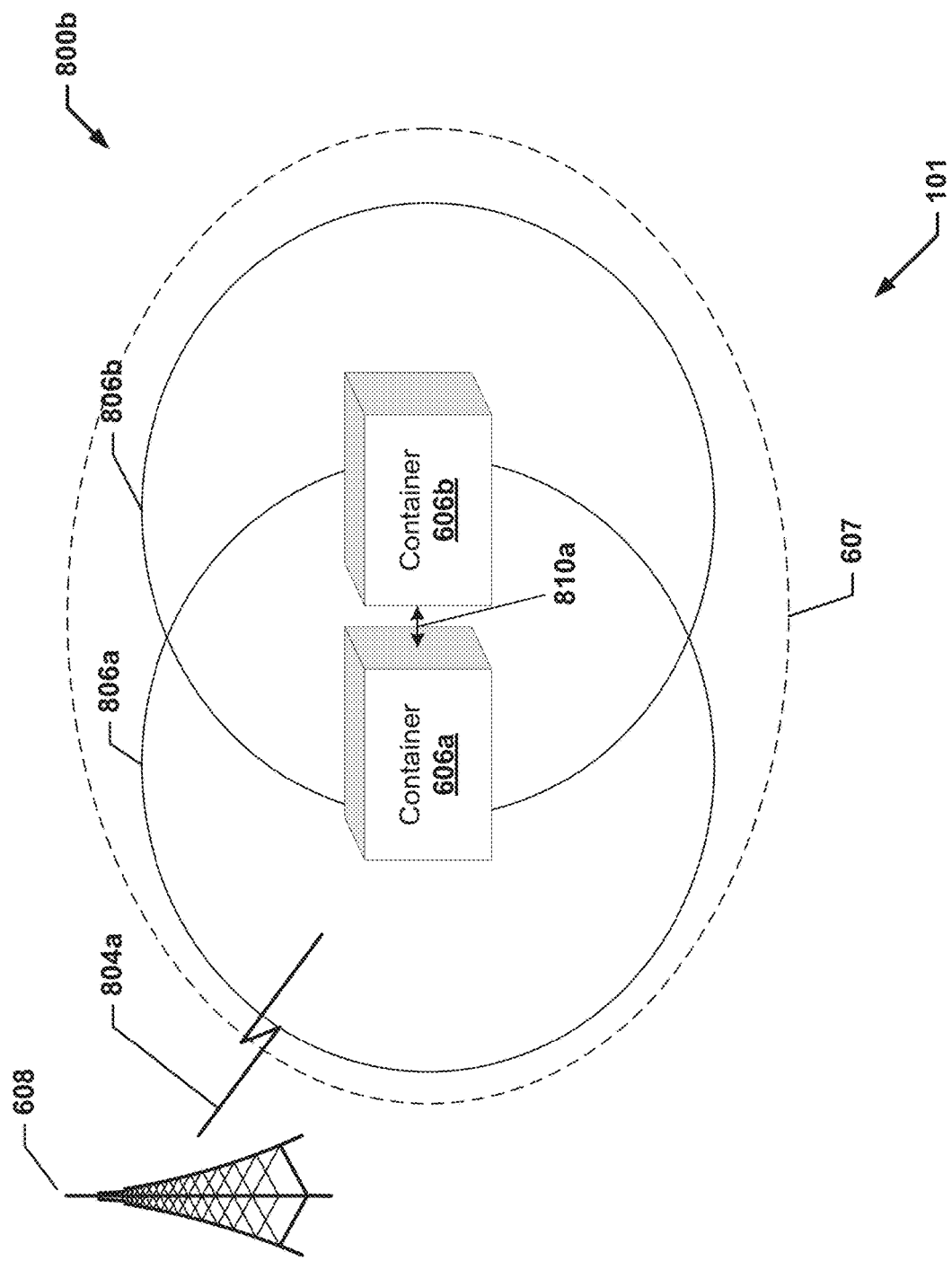
FIG. 8B is a schematic view illustrating an embodiment of the networked container system of FIG. 6 during the method of FIG. 7.
Figure 8C:
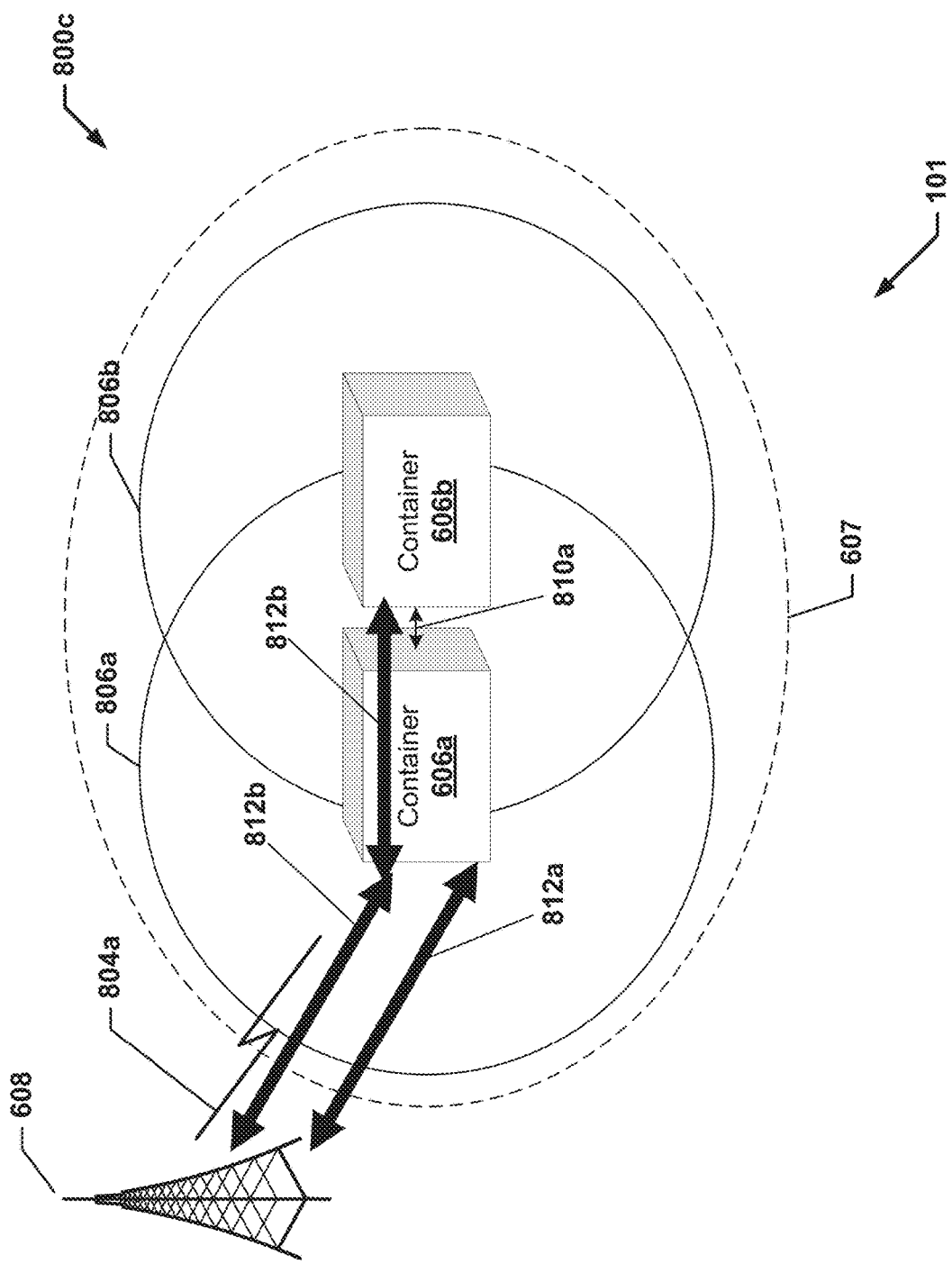
FIG. 8C is a schematic view illustrating an embodiment of the networked container system of FIG. 6 during the method of FIG. 7.

In an embodiment of block 702 and with reference to the networked container system 800b illustrated in FIG. 8B, the container systems 606a and 606b may be positioned in close enough proximity to each other in the physical environment 101 such that the container system 606a is within the coverage area 806b provided by the container system 606b, and the container system 606*b* is within the coverage area 806*a* provided by the container system 606*a*. As such, the container engine 214 in container system 606*a* may communicatively couple the communication interface 220 of the container system 606*a* to the communication interface 220 of the container system 606*b* to form a container-to-container connection 810*a*, which may operate (at least in part) to form the container network 607.

In other embodiments, the container system 606*b* may not include the container module 208, and may only include the closure subsystem 234 discussed above. Therefore, the container-to-container connection 810*a* may be established between the communication interface 220 in the container system 606*a* and the communication interface 246 in the container system 606*b*. The container-to-container connection 810*a* may be established via a link that provides at least a portion of the container network 607 and that is formed between the container systems 606*a* and 606*b*. As such, the other container systems 606*c*-606*aa*, yet other container systems, support systems, and/or other delivery systems, that are provided in the physical environment 101 may join or leave the container network 607 by establishing container-to-container connections with members of the container network 607. For example, the container system 606*c* of FIG. 6 may join the container network 607 by forming a container-to-container connection using its communication interface 220 and with the container system 606*a* and/or the container system 606*b*. Thus, the container network 607 may be an ad hoc network such as a wireless mesh network, a mobile ad hoc network, and/or any other decentralized network that would be apparent to one of skill in the art in possession of the present disclosure. As such, the security engine 242 and/or the container engine 214 may include a routing protocol that controls how nodes (e.g., container systems, delivery systems, and/or support members) included in the container network 607 route packets between the nodes that provide the container network 607. For example, the routing protocol may be based on the wireless communication protocol being used by the communication interfaces 218 and/or 246 to form the ad hoc network (e.g., Bluetooth®, Bluetooth® Low Energy (BLE), near field communication (NFC), infrared data association (IrDA), ANT®, Zigbee®, Z-Wave®, IEEE 802.11 protocols (Wi-Fi), and/or other wireless communication protocols known in the art).

The method 700 may then proceed to block 704 where election information is exchanged between container systems in the container network. In an embodiment of block 704 and with reference to the networked container system 800*b* of FIG. 8B, the container engine 214 included in the container module 208 in the container system 606*a* may exchange election information with the container engine 214 and/or the security engine 242 in the container system 606*b* via the container-to-container connection 810*a*. As such, the container system 606*a* may provide its election information to the container system 606*b*, and the container system 606*a* may receive election information from container system 606*b* via the container-to-container connection 810*a*. Furthermore, the container system 606*a* may exchange its election information with other container systems that are provided in the container network 607 and that are in communication (e.g., directly or indirectly) with the container system 606*a* as well. For example, the container system 606*a* may provide the container system 606*b* with the election information received from other container systems in the networked container system 600 that are linked (directly or indirectly) to the container system 606*a* and/or provide election information for the container systems 606*a* and/or 606*b* to those other container systems as well. Likewise, the container system 606*b* may forward the election information received from the container system 606*a* to another container system that it is linked to it via another container-to-container connection.

In an embodiment, the election information may be information that is used to elect one or more of the container systems 606*a*-606*aa* that are included in the container network 607 to provide communications for the container network 607 to the network 106 via the base station 608, provide sensor measurements for the container network 607, provide location information for the container network, and/or any other functionality that may be performed by a portion of the container system 606*a*-606*aa* for the container network 607, as discussed in further detail below. For example, the election information may include container network information such as the identity of links between nodes in the container network 607, routing information, container system identifiers, container network topology information, and/or any other container network information that would be apparent to one of skill in the art in possession of the present disclosure. Furthermore, the election information may also include container capability information. For example, the container capability information may include power supply information about the power supply system 222 and/or 248 such as, for example, a battery life, a battery lifespan, a rate of use, and/or other power supply information that would be apparent to one of skill in the art in possession of the present disclosure.

Further still, the container capability information may alternatively or additionally include communication interface information about the communication interface 218 such as, for example, a signal strength, a bandwidth, whether the container system includes the communication interface 218, a latency, a type of interface (e.g., cellular, WiFi, satellite), power requirements, etc.), and/or other communication interface information about the communication interface 218 that would be apparent to one of ordinary skill in the art in possession of the present disclosure. The container capability information may also include communication interface information about the communication interface 220 such as, for example, a number of links with other container systems, a bandwidth, a latency, a type of interface (e.g., Zigbee, Bluetooth, or other interfaces discussed above), power requirements, and/or any other communication interface information about the communication interface 220 that would be apparent to one of skill in the art in possession of the present disclosure. The container capability information may also include container component information such as which container sensors, positioning systems, etc. and the like are included in each of the container systems 606*a*-606*aa*, information generated by those components, and other container component information that would be apparent to one of skill in the art in possession of the present disclosure. While specific container capability information is described, one of skill in the art in possession of the present disclosure will recognize that other container capability information about components each of the container systems 606*a*-606*aa* may be included in the election information. Also, while a variety of specific election information has been described, one of skill in the art in possession of the present disclosure will recognize that other election information may be used to determine which container system(s) in the networked container system 600 should enable container network communications between the networked service platform 108 (via the network 106)

and the rest of the container systems without departing from the scope of the present disclosure.

The method 700 may then proceed to block 706 where the election information for each container system in the networked container system is used to elect a second type communication interface in a container system for use in providing container network communications to a wide area network for the plurality of container systems in the container network. In an embodiment of block 706 and with reference to FIG. 8B, the container system 606a and the container system 606b may elect, based on the election information for the container system 606a and the container system 606b, the communication interface 218 of the container system 606a for use in providing the container network communications to the network 106 via the base station 608. In response to such an election, the connection 804a provided by the container system 606a may remain, while the connection 804b may be removed by the container system 606b. For example, the container system 606b may end the connection 804b and/or disable its communication interface 218 by removing some or all of the power provided to that communication interface 218.

In an embodiment of block 706, each container engine 214 and/or security engine 242 may be configured with election rules that may be used to determine which communication interface 218 in the container systems 606a and 606b to use for communicating with the base station 608/to the network 106. In various embodiments, the election rules may be the same on each container system 606a and 606b such that, once those election rules are executed using the same election information, the same election outcome will occur at each container system 606a and 606b that is included in the container network 607. Thus, each container system 606a and 606b in the container network 607 will know which container system(s) are elected to provide the container network communications to the network 106. In other examples, one of the container modules 208 in the container network 607 may be configured to determine the elected container system(s), and may then provide an election notification to the other container systems/container modules that are included in the container network 607 as to which container system(s) is the elected container system(s).

With reference to FIG. 8B and as discussed above, the container system 606a and the container system 606b may determine that the communication interface 218 in the container system 606a is the elected communication interface based on the election rules and the election information discussed above. As such, the container system 606a may use its connection 804a with the base station 608 to communicate container network communications for the container system 606a and 606b. In different embodiments, the communication interface 218 in container system 606a may be elected for a variety of reasons. For example, the election rules may weigh/score election information, and the container system in the container network 607 with a weight/score that is the highest (or in some instances the lowest) may be elected as the elected container system for providing container network communications to the network 106 via its communication interface 218. For example, the container system 606b may not include a communication interface 218 for communication with the base station 608, while the container system 606b does include the communication interface 218 and, as such, the only communication interface 218 for communicating with the base station 608 is provided by the container system 606a, which may result in the container system 606a having the higher weight according to the election rules.

In other examples, when positioned in the delivery system 602 and/or the physical environment 101, the communication interface 218 in the container system 606b may be unable to connect to or have a relatively poor signal strength connection with the base station 608 due to other container systems blocking and/or interfering with the signal 610. However, the container system 606a may be in a location in the delivery system 602 and/or physical environment 101 where the communication interface 218 in the container system 606a can receive a signal or has a relatively greater signal strength than the communication interface 218 of the container system 606b. As such, the container system 606a may be given a higher score than the container system 606b according to the election rules, which causes the container system 606a to be elected to communicate with the network 106.

In another example, the communication interface 218 in the container system 606b may have a greater signal strength than the communication interface 218 of the container system 606a, which gives the container system 606b a higher score according to the election factor based on signal strength. However, a battery life of the power supply system 222 in the container system 606b may have reached a predetermined (low) battery threshold, and thus the election rules may provide a lower score according to this election factor based on available power. Thus, the combined scores according to the battery life and signal strength election factors may result in the container system 606a having the highest combined score that results in the container system 606a providing the communications with the network 106.

In other examples, the communication interface 220 in the container system 606a may have more direct links with other container systems than the communication interface 220 in the container system 606b, resulting in the container system 606a being more likely to be elected to communicate with the network 106. In other examples, the type of communication interface 218 in the container system 606a may be preferable over the type of communication interface 218 of the container system 606b, resulting in the container system 606a being more likely to be elected to communicate with the network 106. For example, a WiFi communication interface connecting to the network 106 may be preferable over a cellular communication interface.

In various examples, the election information for a container system may automatically disqualify that container system as being a candidate to communicate with the network 106 for other container systems (e.g., no communication interface 218). In yet other examples, the bandwidth of the communication interfaces 218 in the container systems 606a and 606b by themselves may not support the container network communications for the container network 607 and, as such, the communication interfaces 218 of both the container system 606b and the container system 606a may be elected to provide the container network communications for other container systems within the container network 607. In another example, if both the communication interfaces 218 in the container systems 606a and 606b have good access to the network 106, then the communication interfaces in the container systems 606a and 606b may share the container network communications from one transmission to the next or provide a portion of the container network communications from various other container systems at the same time and therefore conserve battery power, reduce latency, and communicate information in an intelligent way. While different examples of electing a long-range communication interface 218 in a container system/container module are discussed above, one of skill in the art in possession of the present disclosure will recognize that other techniques for electing of one or more communication interfaces 218 in the container systems for use in providing network container communications with the network 106 may be considered without departing from the scope of the present disclosure.

In various embodiments of block 706, the election information for each container system in the networked container system may be used to elect various components included on one or more of the plurality of container systems in the container network. In an embodiment of block 706 and with reference to FIG. 8B, the container system 606*a* and the container system 606*b* may elect, based on the election information for the container system 606*a* and the container system 606*b*, one or more container sensors of the container sensors 226, a positioning system 224, and/or any other container components from one of the container system 606*a* or the container system 606*b* that provide common or generally common functionality that is redundant if each container system 606*a* and 606*b* perform the function. For example, because the container systems 606*a* and 606*b* are generally in the same location when included in the container network 607, the container system 606*a* and the container system 606*b*, using the election information, may elect the positioning system 224 (e.g., a GPS) of the container system 606*b* to provide location information for both the container system 606*a* and 606*b* that are included in the networked container system 800*b*. As a result, the container system 606*a* may power down or reduce power provided to the positioning system 224 of the container system 606*a*.

In another example, using the election information, the container system 606*a* and the container system 606*b* may elect an external temperature sensor included in the container sensors 226 included on the container system 606*a* for both the container system 606*a* and the container system 606*b* due to the container systems 606*a* and 606*b* being in generally the same physical environment 101, which would likely have the same temperature where the container systems 606*a* and 606*b* are located. As a result, the container system 606*b* may power down or reduce power provided to the external temperature sensor included on the container system 606*b*, and the container system 606*a* may provide the external temperature information generated by its external temperature sensor to the container system 606*b* via the container-to-container connection 810*a*. In various embodiments, the container engines 214 included in the container systems 606*a* and 606*b* may remember which components of the container systems 606*a* and 606*b* that were elected in a previous cycle and switch between the components of the container systems 606*a* and 606*b* that were elected based on the election information. Therefore, the container systems 606*a* and 606*b* may share the burden providing the component functionality for the container network 607 across the container systems 606*a* and 606*b*—evening the battery usage across container systems 606*a* and 606*b* included in the container network 607. By electing components of the container systems 606*a* and 606*b* that are redundant and powering down or reducing power to the components that are not elected, the container systems 606*a* and 606*b* may extend battery life of the power supplies 222 and/or 248 provided in the container systems 606*a* and/or 606*b*.

The method 700 may then proceed to block 708 where container network communications are provided via the second type communication interface in the elected container system to the wide area network. In an embodiment of block 708 and with reference to FIG. 8C, the container system 606*a*, which is the elected container system in this example, may provide container network communications 812*a* that originated from the container system 606*a* or that are destined for the container system 606*a* via the connection 804*a*. Furthermore, container network communications 812*b* for the container system 606*b* may be routed through the container system 606*a* via the container-to-container connection 810*a* and via the connection 804*a*. The container network communications 812*a* and/or 812*b* may include the notifications of the method 300 that may include container identifiers, security information, location information, and/or any other sensor information that is discussed above as being provided to the network service platform 108. For example, if a security event occurs on the container system 606*b* and the container system 606*b* cannot by itself communicate the security event to the network service platform 108, the container system 606*b* may provide a notification of the security event to the container system 606*a*. The container system 606*a* may then forward the notification of the security event to the network service platform 108 via its communication interface 218. The container system 606*b* may also forward container network communications, which are received from other container modules 208 in other container systems included in the container network 607, to the container system 606*a* such that the container system 606*a* may forward those container network communications to the base station 608 for provision to the network 106.

In various embodiments of the present disclosure, the communication interface that is elected for communication with the network 106 may dynamically change. For example, when a container network event occurs (e.g., after a predetermined time interval, following the joining of a node to the container network 607, following the leaving of a node from the container network 607, and/or in response to other container network events) at decision block 710 of method 700, the container systems in the container network 607 may exchange election information again at block 704. As such, the container systems may elect a new communication interface 218 in one or more of the container systems in the container network 607 for use in providing container network communications to the network 106 at block 706. While communication interfaces 218 in container systems 606*a* and/or 606*b* are described as being elected to provide container network communications to the network 106, it is contemplated that the support member 604 may be elected to provide container network communications to the network 106, as the support member 604 may include a container module 208 and/or a communication interface 218 that is capable of doing so, as discussed above. As such, one of skill in the art will recognize that a communication interface 218 included in the support member 604, the container systems 606*a*-606*aa*, the delivery system 602, and/or any other communication interface 218 that is coupled to a communication interface 220 in order to receive container network communications from the communication interfaces 220 in the containers systems, is contemplated as capable of election to provide the container network communications with the network 106 discussed above.

In various embodiments of the present disclosure, the election information for each container system in the networked container system may be used to elect one of the container systems to monitor the plurality of container systems in the container network. In an embodiment of block 706 and with reference to FIG. 8B, the container system 606*a* and the container system 606*b* may elect, based on the election information for the container system 606*a* and the container system 606*b*, the container engine 214 of the container system 606*a* or the container engine 214 of the container system 606b to performing monitoring functionality for the plurality of containers that are in the container network 607. For example, the container engine 214 of the container system 606a may be elected because it is providing the container network communications for the container network 607 via its communication interface 218 to the network 106. However, the container systems 606a and 606b may elect the container system 606b to balance the power usage between the container system 606a and 606b or based on the election information in other ways that would be apparent to one of skill in the art in possession of the present disclosure.

The elected container engine 214 may monitor election information, container network communications, and/or sensor/component information that is not provided in the container network communications or election information to determine whether a predetermined condition has been satisfied. For example, a predetermined condition may include any errors, faults, and/or other conditions detected on any of the components of the plurality of container systems included in the container network. For example, the elected container engine 214 may check variation across the container systems in the container network 607. In a specific example, vibration data from vibrations sensors included in the container sensors 226 for various container systems in the container network 607 may change according to the position in the stack. A predetermined condition may include the difference in vibration data between container systems satisfying a threshold, an average of the vibration data of the container systems satisfying a threshold, and/or any other predetermined vibration condition that would be apparent to one of skill in the art in possession of the present disclosure. In another specific example, temperature data from temperature sensors that are included in the container sensor 226 may vary from the inner container system to those on the extremities of the container network 607. A predetermined condition may include the difference in temperature data between container systems satisfying a threshold, an average of the temperature data of the container systems satisfying a threshold, and/or any other predetermined temperature condition that would be apparent to one of skill in the art in possession of the present disclosure. If the predetermined condition is satisfied, then the elected container engine 214 may provide a notification to the user in the container network communications that are provided to the network 106. Thus, the container network 607 can provide variation data and best and worst-case scenarios to help improve the service or product insights. For example, if a transporter has promised chilled transportation, but a truck that is hauling the container systems that are included in the container network 607 is left in the sun during a break, the inner container system 606n may be cooled according to the agreement but container systems (e.g., container systems 606a-606c, 606j-606l, and 606s-606u) that are closest to the sun or other heat source may not be cooled according to the agreement.

In another example, fault finding and maintenance of the container components can be assisted by the comparison of the data from the plurality of containers in the container network 607. The elected container engine 214 may monitor for predetermined conditions such as odd or irreconcilable differences between a component of one container system of the container network 607 and other components of other container systems in the container network 607 that correspond with that component. If the predetermined condition is satisfied, then the elected container engine 214 may provide a notification to the user in the container network communications that are provided to the network 106 of the fault or discrepancy. While the monitoring of the container network 607 is described as being performed by one of the container systems included in the container network 607, one of skill in the art will recognize that the monitoring for predetermined conditions may be performed by the network service platform 108 that receives the data used to monitor for the predetermined conditions via the container network communications. The network service platform 108 may provide notifications to the user base on those predetermined conditions being satisfied.

Thus, systems and methods have been described that provide a networked container system in which a plurality of containers systems can form a local container network using a first type communication interface, and then elect one or more of the container systems to provide container network communications to a wide area network for each of the other container systems via a second type communication interface on those elected container system(s). In other examples, other container components that provide redundant functionality when the container systems are within a container network may be elected to provide the functionality to reduce the redundancy and save on power consumption and battery life. The elected container system(s) may be elected based on election information exchanged between the container systems in the local container network, and the elected container system(s) may periodically change based on new election information, and/or as container systems join and leave the local container network. As such, container systems that are not configured to communicate with the wide area network (e.g., for lack of a second type communication interface) or container systems whose second type communication interface cannot communicate with the wide area network because signals are blocked due to the location of that container system in the physical environment, can communicate container network communications to the elected container system via the local container network, and the elected container system(s) may then use second type communication interface(s) to communicate those container network communications to the wide area network. Furthermore, power savings can be achieved as the second type communication interfaces of various container systems in the local container network can be powered down or put in a reduced power state, while a first type communication interface that operates at a lower power level can provide the container network communications to the elected container system.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A container network, comprising:
   a first container system that includes a first container first type communication interface; and
   a second container system that includes a second container first type communication interface, wherein the second container system is configured to:
   communicatively couple to the first container first type communication interface via the second container first type communication interface to form a first container-to-container connection;
   perform a first exchange of first election information of the first container system and second election information of the second container system with the first container system via the first container-to-container connection;
   elect, based on the first election information and the second election information, a second container second type communication interface included on the second container system to provide container network communications to a wide area network; and
   provide first container network communications via the second container second type communication interface to the wide area network.

2. The container network of claim 1, wherein the first container network communications include first container communications received from the first container system via the first container-to-container connection.

3. The container network of claim 1, wherein the first container network communications include second container communications from the second container system.

4. The contain network of claim 3, wherein the second container communications include second container sensor data from at least one sensor included in the second container system.

5. The container network of claim 1, wherein the first container system is configured to:
   elect, based on the first election information and the second election information, the second container second type communication interface included on the second container system to provide container network communications to the wide area network; and
   reduce power to a first container second type communication interface included on the first container system.

6. The container network of claim 1, wherein the first container system is configured to:
   elect, based on the first election information and the second election information, a first container second type communication interface included on the first container system and the second container second type communication interface included on the second container system to provide container network communications to the wide area network; and
   provide a portion of the first container network communications on the first container second type communication interface to the wide area network.

7. The container network of claim 1, wherein the first container system is configured to:
   elect, based on the first election information and the second election information, a first container component included on the first container system to operate, wherein the second container system is configured to:
   reduce, based on the first election information and the second election information, power provided to a second container component included on the second container system that corresponds with the first container component due to the second container component providing a redundant function to a function provided by the first container component.

8. The container network of claim 1, wherein the second container system is configured to:
   perform a second exchange of third election information of the first container system and fourth election information of the second container system subsequent to the first exchange via the first container-to-container connection;
   elect, based on the third election information and the fourth election information of the second exchange, a first container second type communication interface included on the first container system to provide container network communications to the wide area network; and
   provide, via the first container-to-container connection, second container network communications destined to the wide area network to the first container system.

9. The container network of claim 8, wherein the second container system is configured to:
   reduce power to the second container second type communication interface.

10. The container network of claim 1, wherein the second container system is configured to:
    receive a notification, via the first container-to-container connection, that a third container system has communicatively coupled to the first container first type communication interface via a third container first type communication interface included on the third container system to form a second container-to-container connection; and
    provide third container network communications, received from the first container system via the first container-to-container connection that originated from the third container system, via the second container second type communication interface to the wide area network.

11. The container network of claim 10, wherein the second container system is configured to:
    perform a second exchange of third election information of the first container system, fourth election information of the second container system, and fifth election information of the third container system with the first container system and the third container system via the first container-to-container connection and the second container-to-container connection;
    elect, based on the third election information, the fourth election information, and the fifth election information a third container second type communication interface included on the third container system to provide container network communications to the wide area network; and provide second container network communications to the first container system via the first container-to-container connection to be routed to the third container system by the first container system via the second container-to-container connection.

12. The container network of claim 1, wherein the second container system is configured to:
receive first sensor information from the first container system via the first container-to-container connection;
determine, based on the first sensor information, that a predetermined condition is satisfied; and
provide, in response to the determining that the predetermine condition is satisfied, a notification included in the first container network communications via the second container second type communication interface to the wide area network.

13. A container module, comprising:
a first type communication interface;
a first component;
a processing system that is coupled to the first type communication interface and the first component; and
a memory system that is coupled to the processing system and that includes instruction that, when executed by the processing system, causes the processing system to provide a container engine that is configured to:
communicatively couple to a first type second communication interface include in a first container system via the first type communication interface to form a first container-to-container connection;
perform a first exchange of first election information of the container module and second election information of the first container system with the first container system via the first container-to-container connection;
elect, based on the first election information and the second election information, the first component over a first container component included on the first container system that corresponds with the first component; and
operate the first component.

14. The container module of claim 13, wherein the container engine is configured to:
perform a second exchange of third election information of the container module and fourth election information of the first container system subsequent to the first exchange via the first container-to-container connection;
elect, based on the third election information and the fourth election information of the second exchange, the first container component included on the first container system over the first component that corresponds; and
reduce power to the first component.

15. The container module of claim 13, wherein the first container system is configured to:
elect, based on the first election information and the second election information, the first component over the first container component; and
reduce power to the first container component.

16. The container module of claim 13, further comprising:
a second component coupled to the processing system, wherein the container engine is configured to:
elect, based on the first election information and the second election information, a second container component included on the first container system that corresponds with the second component; and
reduce power to the second component.

17. The container module of claim 13, wherein the first component is one of a second communication interface configured to communicate with a wide area network, a first container sensor that gathers data that is redundant to a second container sensor provided on the first container system, or a positioning system.

18. A method to provide container network communications, comprising:
communicatively coupling, by a container module, a first type communication interface included in the container module to a first type second communication interface included in a first container system to form a first container-to-container connection;
performing, by the container module, a first exchange of first election information of the container module and second election information of the first container system with the first container system via the first container-to-container connection;
electing, by the container module and based on the first election information and the second election information, a second type communication interface include in the container module to provide container network communications to a wide area network; and
providing first container network communications via the second type communication interface to the wide area network.

19. The method of claim 18, further comprising:
electing, by the container module based on the first election information and the second election information, a first container second type communication interface included on the first container system to provide container network communications to the wide area network; and
providing, by the container module, a portion of the first container network communications on the first container second type communication interface to the wide area network.

20. The method of claim 18, further comprising:
performing, by the container module, a second exchange of third election information of the container module and fourth election information of the first container system subsequent to the first exchange via the first container-to-container connection;
electing, by the container module based on the third election information and the fourth election information of the second exchange, a first container second type communication interface included on the first container system to provide container network communications to the wide area network;
providing, by the container module via the first container-to-container connection, second container network communications destined to the wide area network to the first container system; and
reducing, by the container module, power to the second type communication interface.

* * * * *